United States Patent [19]

Sano et al.

[11] Patent Number: 5,480,478

[45] Date of Patent: Jan. 2, 1996

[54] RECORDING LIQUID

[75] Inventors: Hideo Sano; Yukichi Murata; Toru Nishimura; Masahiro Yamada; Hiroshi Takimoto, all of Kanagawa; Nobuyoshi Satoh, Tokyo, all of Japan

[73] Assignee: Mitsubishi Chemical Corporation, Tokyo, Japan

[21] Appl. No.: 350,077

[22] Filed: Nov. 29, 1994

[30]   Foreign Application Priority Data

Nov. 29, 1993  [JP]  Japan ................................. 5-298186
Dec. 1, 1993   [JP]  Japan ................................. 5-301925
Dec. 1, 1993   [JP]  Japan ................................. 5-301927
Aug. 26, 1994  [JP]  Japan ................................. 6-202056

[51] Int. Cl.⁶ ................................................. G09D 11/02
[52] U.S. Cl. .......................................................... 106/22 K
[58] Field of Search ............................................. 106/22 K

[56]           References Cited

U.S. PATENT DOCUMENTS

| | | | |
|---|---|---|---|
| 4,620,876 | 11/1986 | Fujii et al. | 106/22 K |
| 4,765,838 | 8/1988 | Ohata et al. | 106/22 K |
| 4,975,118 | 12/1990 | Mayer et al. | 106/22 K |
| 5,175,260 | 12/1992 | Schroeder et al. | 106/22 K |
| 5,215,578 | 6/1993 | Eida et al. | 106/22 K |
| 5,437,716 | 8/1995 | Sano et al. | 106/22 K |

FOREIGN PATENT DOCUMENTS

| | | |
|---|---|---|
| 61-2760 | 1/1986 | Japan . |
| 61-2776 | 1/1986 | Japan . |
| 61-57650 | 3/1986 | Japan . |
| 61-57666 | 3/1986 | Japan . |
| 1-240584 | 9/1989 | Japan . |
| 3-1000081 | 4/1991 | Japan . |
| 4-59879 | 2/1992 | Japan . |

*Primary Examiner*—Helene Klemanski
*Attorney, Agent, or Firm*—Sughrue, Mion, Zinn, Macpeak & Seas

[57]            ABSTRACT

A recording liquid comprising an aqueous medium and at least one dye selected from dyes, a free acid form of which is represented by formula (I), (II), (III) or (VI), the symbols in the formulae being defined in the specification:

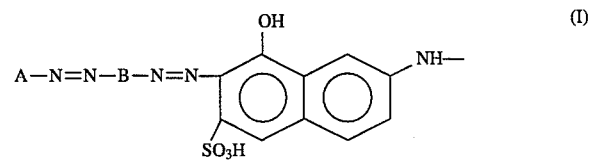

(I)

-continued

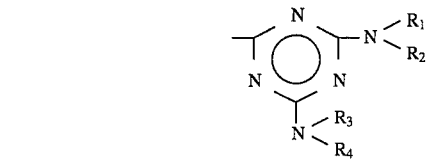

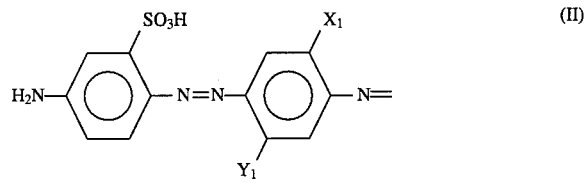

(II)

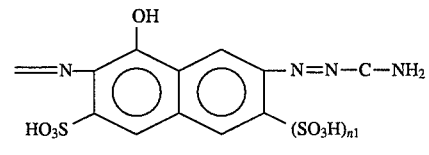

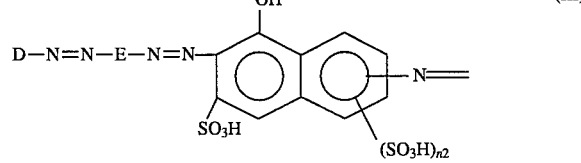

(III)

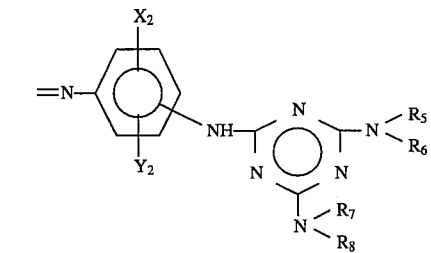

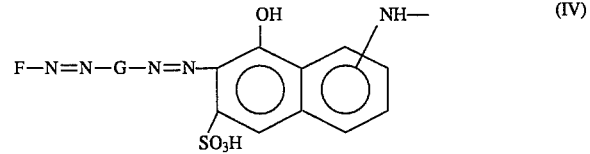

(IV)

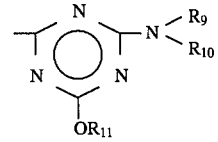

26 Claims, No Drawings

RECORDING LIQUID

FIELD OF THE INVENTION

This invention relates to a recording liquid. More particularly, the present invention relates to a recording liquid of a black color type suitable for ink-jet recording.

BACKGROUND OF THE INVENTION

A so-called ink-jet recording method has been put into practical use in which liquid droplets of a recording liquid containing a water-soluble colorant, e.g., a direct dye or an acid dye, are issued from a minute ejection orifice to conduct recording.

With respect to the recording liquid, it is required to be stably ejectable over a long period of time and to rapidly fix to recording papers for general business use, e.g., paper for PPCs (plain-paper copiers) such as electrophotographic paper, and fanfold paper (continuous paper for computers, etc.), to give a print in which the printed characters are of good quality, that is, the printed characters should be free of blurring and have clear contours. The recording liquid is also required to have an excellent storage stability. Therefore, solvents usable in the recording liquid are severely restricted.

Colorants used for the recording liquid are necessary to meet the requirements such that they have sufficient solubility in the solvents which are restricted as described above, that they are capable of stably ejecting the recording liquid over a long period of time, that they are stable even when they are stored for a long period of time, that they can provide printed images having a high density, and that they have excellent water-resistance and light-resistance. However, it has been difficult to satisfy these various requirements at the same time.

In order to meet the above requirements, various methods have been proposed in, for example, JP-A-55-144067, JP-A-55-152747, JP-A-57-207660, JP-A-59-226072, JP-A-61-2776, JP-A-61-57666, JP-A-61-285276, JP-A-62-190269, JP-A-62-190271, JP-A-62-190272, JP-A-62-250082, JP-A-62-246975, JP-A-62-246974, JP-A-62-288659, JP-A-63-8463, JP-A-63-22867, JP-A-63-117079, JP-A-63-30567, JP-A-63-33484, JP-A-63-63764, JP-A-63-105079, JP-A-64-31877, JP-A-1-93389, JP-A-1-210464, JP-A-1-240584, JP-A-2-16171, JP-A-2-140270, JP-A-3-100081, JP-A-3-200882 and JP-A-5-230407 (the term "JP-A" as used herein means an unexamined published Japanese patent application), but recording liquids which sufficiently meet commercial requirements have not been developed.

SUMMARY OF THE INVENTION

An object of the present invention is to provide a black recording liquid of a black color type (1) which is capable of providing a good print quality when used in the ink-jet recording and writing, (2) when the recording liquid is used for recording on plain paper, which gives recorded images having a high density and excellent in light-resistance and, in particular, in water-resistance and color tone of recorded image, and (3) which has good stability in storage for a long period of time.

Other objects and effects of the present invention will be apparent from the following description.

The present invention relates to a recording liquid comprising an aqueous medium and at least one dye selected from dyes, a free acid form of which is represented by formula (I), (II), (III) or (IV):

The present invention relates to a recording liquid comprising an aqueous medium and at least one dye selected from dyes, a free acid form of which is represented by formula (I), (II), (III) or (IV):

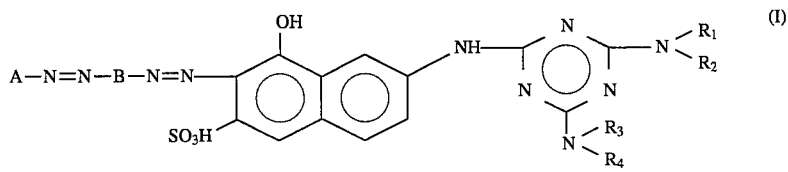

wherein A represents a phenyl group or a naphthyl group, each of which is substituted with at least one of a sulfo group and a carboxyl group and may have additional substituents; B represents a phenylene group which may be substituted with a sulfo group, a carboxyl group, a substituted or unsubstituted alkyl group having from 1 to 9 carbon atoms, a substituted or unsubstituted alkoxy group having from 1 to 4 carbon atoms or an acylamino group having from 2 to 7 carbon atoms, or a naphthylene group substituted with a sulfo group; and $R_1$, $R_2$, $R_3$ and $R_4$ each independently represents a hydrogen atom, an alkyl group having from 1 to 18 carbon atoms, an alkenyl group having from 1 to 18 carbon atoms, an aryl group, an aralkyl group, a cycloalkyl group or a heterocyclic group wherein each of these groups may have substituents and at least one of $R_1$, $R_2$, $R_3$ and $R_4$ represents a group substituted with a carboxyl group,

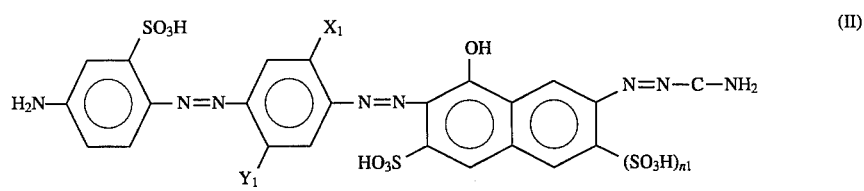

wherein C represents a phenylene group which may have one or more substituents selected from the group consisting of a substituted or unsubstituted alkyl group having from 1 to 7 carbon atoms, a substituted or unsubstituted alkoxy group having from 1 to 9 carbon atoms, an amino group, a carboxyl group, a hydroxyl group, a sulfo group and a halogen atom; $X_1$ and $Y_1$ each independently represents a hydrogen atom, a substituted or unsubstituted alkyl group having from 1 to 7 carbon atoms or a substituted or unsubstituted alkoxy group having from 1 to 9 carbon atoms, and the sum of the carbon atoms in $X_1$ and $Y_1$ is 5 or more; and n1 represents 0 or 1, substituted with 1 to 4 carboxyl groups.

DETAILED DESCRIPTION OF THE INVENTION

The dyes used in the recording liquid of the present invention are those of the free acid forms represented by formulae (I), (II), (III) and (IV). The dyes represented by each formulae are described hereinafter in greater detail.

1. Dyes of Formula (I)

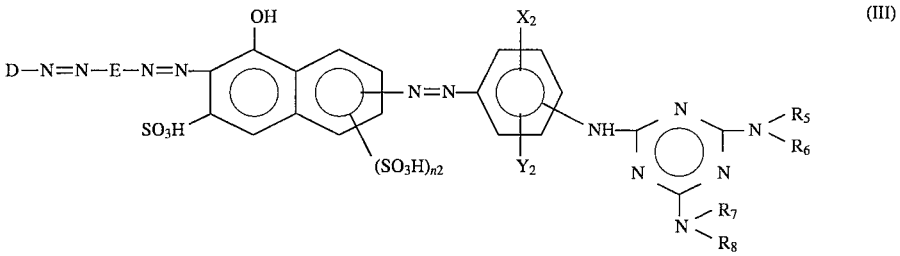

(III)

wherein D represents a substituted or unsubstituted phenyl group or a substituted or unsubstituted naphthyl group; E represents a substituted or unsubstituted phenylene group or a substituted or unsubstituted naphthylene group; $X_2$ and $Y_2$ each independently represents a hydrogen atom, an amino group, an acylamino group, a sulfo group, a carboxyl group, a halogen atom, a substituted or unsubstituted alkyl group having from 1 to 9 carbon atom or a substituted or unsubstituted alkoxy group having from 1 to 9 carbon atoms; $R_5$, $R_6$, $R_7$ and $R_8$ each independently represents a hydrogen atom, a substituted or unsubstituted alkyl group having from 1 to 18 carbon atom, a substituted or unsubstituted alkenyl group having from 1 to 18 carbon atoms, a substituted or unsubstituted aryl group, a substituted or unsubstituted aralkyl group, a substituted or unsubstituted cycloalkyl group, or a substituted or unsubstituted heterocyclic group; and n2 represents 0 or 1, The phenyl group or the naphthyl group represented by A may have, in addition to the sulfo group ($-SO_3H$) and the carboxyl group ($-COOH$), one or more substituents such as an amino group, an acylamino group having from 2 to 7 carbon atoms (for example, an acetylamino group and a benzoylamino group), a substituted or unsubstituted alkyl group having from 1 to 9 carbon atoms (for example, a straight chain or branched chain alkyl group having from 1 to 9 carbon atoms such as a methyl group, an ethyl group, an n-propyl group, an isopropyl group and an n-butyl group, and these alkyl groups which are substituted with a fluorine atom or a substituted amino group such as a trifluoromethyl group and a dimethylaminomethyl group), a substituted or unsubstituted alkoxy group having from 1 to 4 carbon atoms (for example, a straight chain or branched chain alkoxy group having from 1 to 4 carbon atoms such as a methoxy group, an ethoxy group, an isopropoxy group and an n-bu-

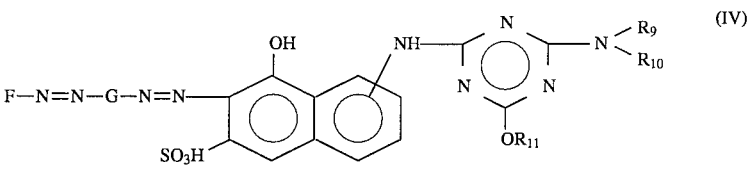

(IV)

wherein F represents a substituted or unsubstituted phenyl group or a substituted or unsubstituted naphthyl group; G represents a phenylene group which may be substituted with a sulfo group, a carboxyl group, a substituted or unsubstituted alkyl group having from 1 to 9 carbon atoms, a substituted or unsubstituted alkoxy group having from 1 to 4 carbon atoms or an acylamino group having from 2 to 7 carbon atoms, or a naphthylene group substituted with a sulfo group; $R_9$, $R_{10}$ and $R_{11}$ each independently represents a hydrogen atom, a substituted or unsubstituted alkyl group having from 1 to 18 carbon atoms, a substituted or unsubstituted alkenyl group having from 1 to 18 carbon atoms, a substituted or unsubstituted aryl group, a substituted or unsubstituted aralkyl group, a substituted or unsubstituted alicyclic group or a substituted or unsubstituted heterocyclic group, and at least one of $R_9$, $R_{10}$ and $R_{11}$ represents a group toxy group, and these alkoxy groups in which the alkyl moiety thereof is substituted with a hydroxyl group or an alkoxy group such as a hydroxyethoxy group and a methoxyethoxy group), a hydroxyl group, and a halogen atom such as a chlorine atom, a bromine atom and a fluorine atom.

The substitutents on the phenylene group represented by B include a sulfo group, a carboxyl group, the above-described substituted or unsubstituted alkyl group having from 1 to 9 carbon atoms, the above-described substituted or unsubstituted alkoxy group having from 1 to 4 carbon atoms, and the above-described acylamino group having from 2 to 7 carbon atoms.

$R_1$, $R_2$, $R_3$ and $R_4$ each independently represents a hydrogen atom, a substituted or unsubstituted alkyl group having from 1 to 18 carbon atoms (for example, a straight chain or branched chain alkyl group having from 1 to 18 carbon atoms such as a methyl group, an ethyl group, an n-butyl group, an n-octyl group and an ethylhexyl group, and these alkyl groups substituted with a hydroxyl group, a carboxyl group, a carboxycyclohexyl group, a mercapto group or a carbamoyl group such as a hydroxyethyl group, a carboxypropyl group, a carboxycyclohexylmethyl group, a 1-carboxy-2-mercaptoethyl group, a 1-carboxy-2-carbamoylethyl group, a 1-isopropyl-1-carboxymethyl group and a 1,2-dicarboxypropyl group), a substituted or unsubstituted alkenyl group having from 1 to 18 carbon atoms (for example, a straight chain or branched chain alkenyl group such as a 2-methyl-1-propenyl group, a vinyl group and an allyl group which may be substituted with a carboxyl group, a halogen atom or a hydroxyl group), an aryl group (for example, a phenyl group and a phenyl group substituted with a carboxyl group or an alkyl group such as 3,4-dicarboxyphenyl group, a 4-butylphenyl group and a 4-carboxyphenyl group), an aralkyl group (for example, a phenylalkyl group having from 7 to 15 carbon atoms such as a benzyl group and a phenylethyl group, and a phenylalkyl group substituted with a carboxyl group or a hydroxyl group such as a 1-carboxy-2-phenylethyl group, a 1-carboxy-2-hydroxyphenylethyl group and a 4-carboxybenzyl group), a cycloalkyl group (for example, a cyclohexyl group, and a cycloalkyl group substituted with a carboxyl group or a hydroxyl group such as a 4-carboxycyclohexyl group and a 4-hydroxycyclohexyl group), or a heterocyclic group (for example, a 5- to 6-membered ring containing 1 or 2 nitrogen atoms and/or sulfur atoms or a condensed ring thereof or a condensed ring thereof with a benzene ring, each of which may be substituted with an alkyl group or a carboxyl group, such as a pyridyl group, a thiadiazolyl group, a benzothiazolyl group and a 2,2,6,6-tetramethylpiperidinyl group), and at least one of $R_1$, $R_2$, $R_3$ and $R_4$ represents a group substituted with 1 to 4 carboxyl groups.

In the present invention, the compounds of general formula (I) wherein one of $R_1$ and $R_2$, and one of $R_3$ and $R_4$ each independently represents a hydrogen atom, and the others each represents a group selected from a substituted or unsubstituted alkyl group having from 1 to 18 carbon atoms, an aryl group, an aralkyl group, a cyclohexyl group and a heterocyclic group, and wherein at least one of $R_1$, $R_2$, $R_3$ and $R_4$ is substituted with a carboxyl group are preferred.

Specific examples of the dye of formula (I) include azo dyes shown by the following structures (I)-(1) to (I)-(24), and these dyes can be used singly or in combination depending upon the desired color tone.

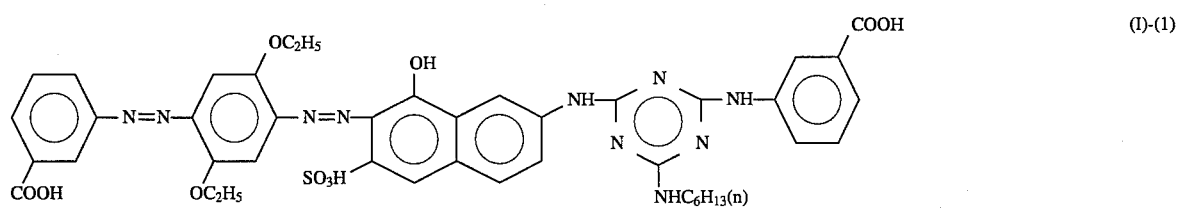

(I)-(1)

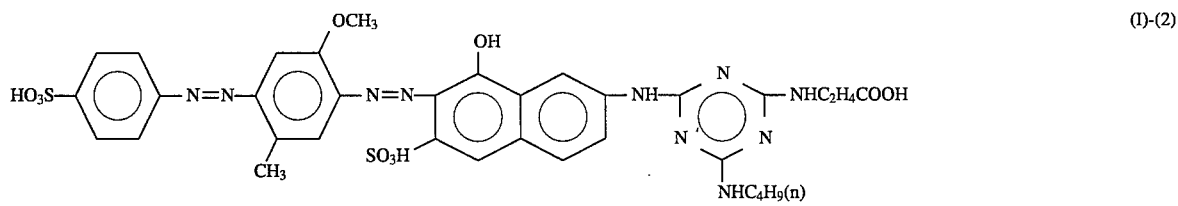

(I)-(2)

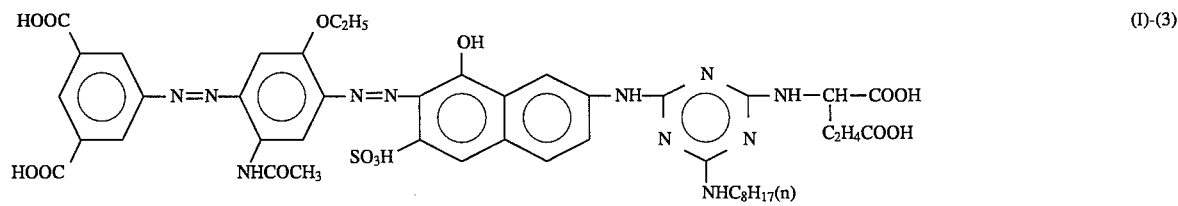

(I)-(3)

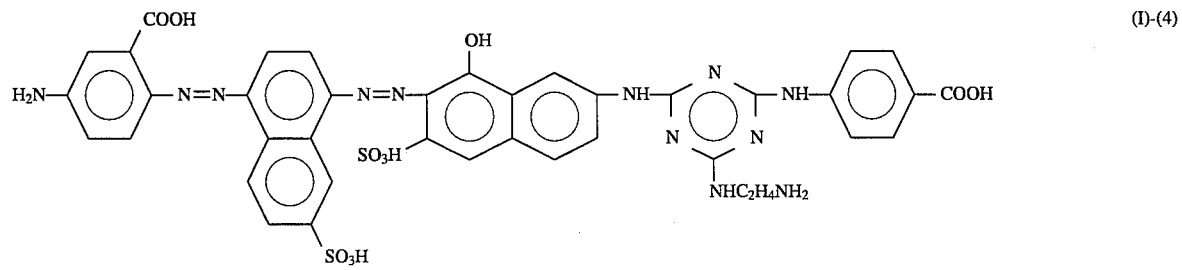

(I)-(4)

-continued
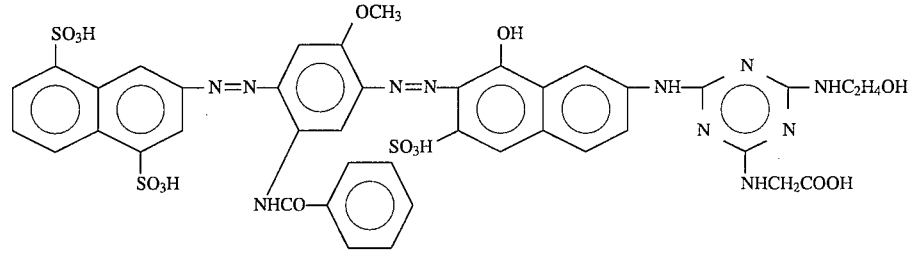
(I)-(5)
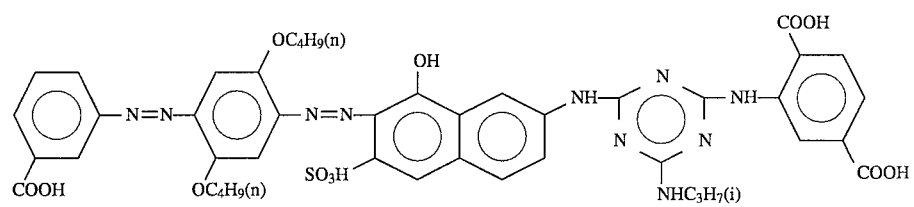
(I)-(6)
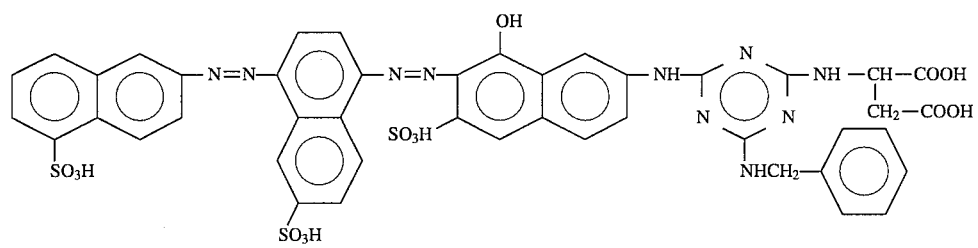
(I)-(7)
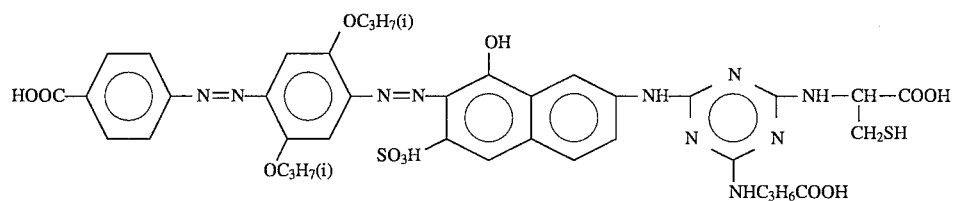
(I)-(8)
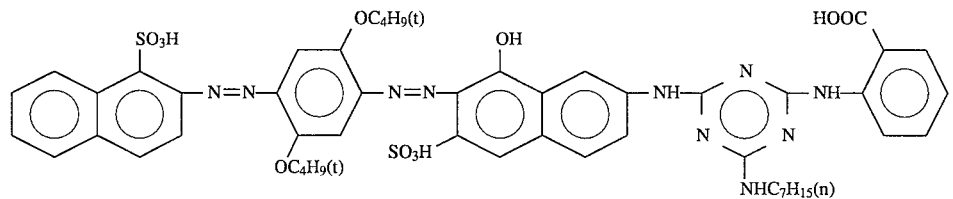
(I)-(9)
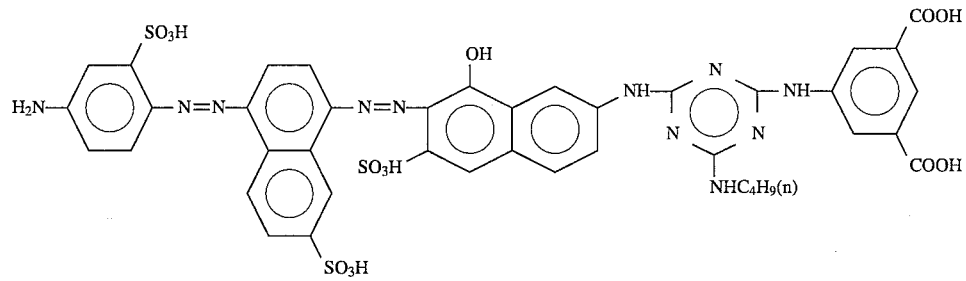
(I)-(10)
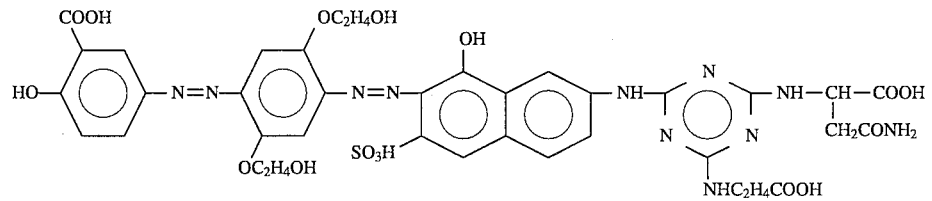
(I)-(11)

-continued
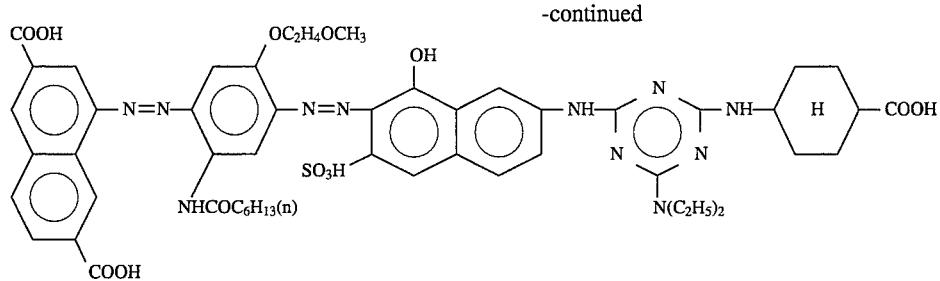 (I)-(12)
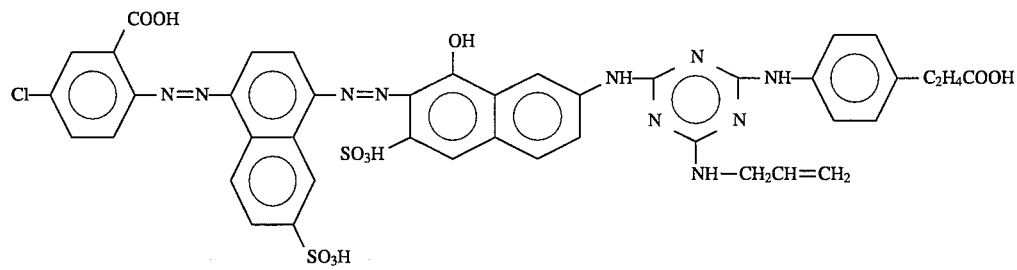 (I)-(13)
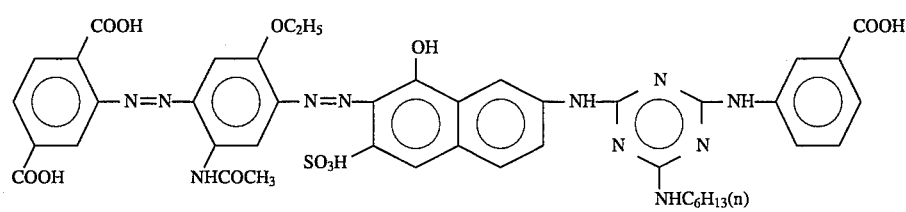 (I)-(14)
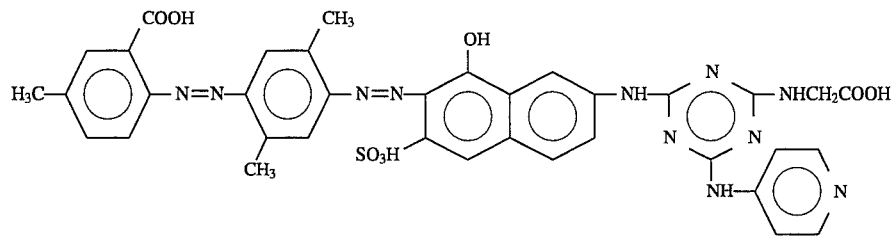 (I)-(15)
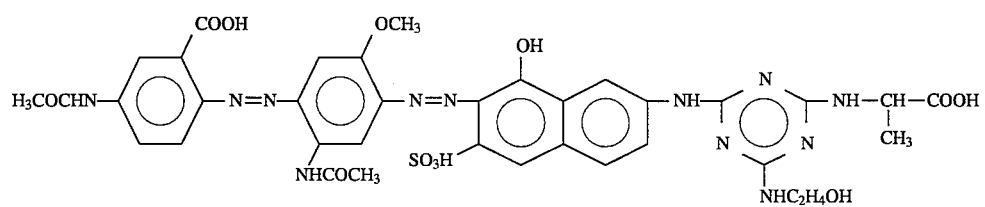 (I)-(16)
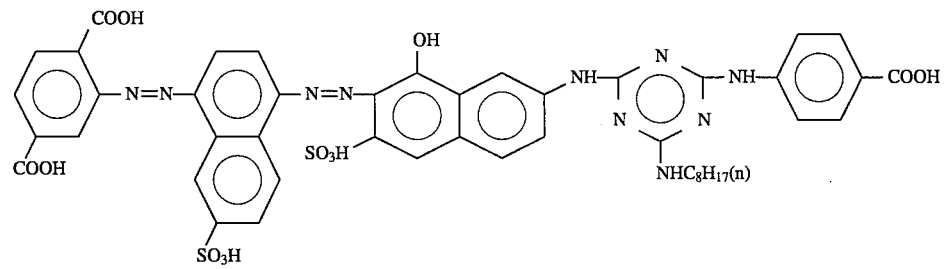 (I)-(17)

-continued
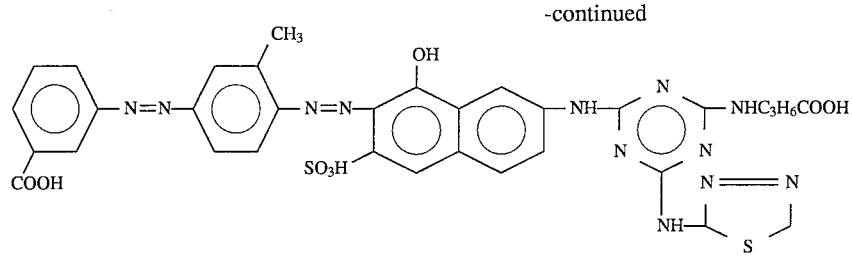
(I)-(18)
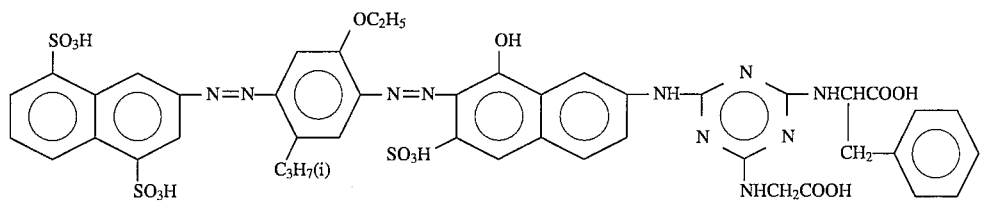
(I)-(19)
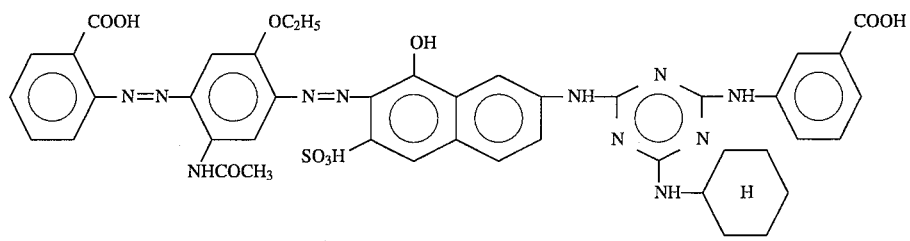
(I)-(20)
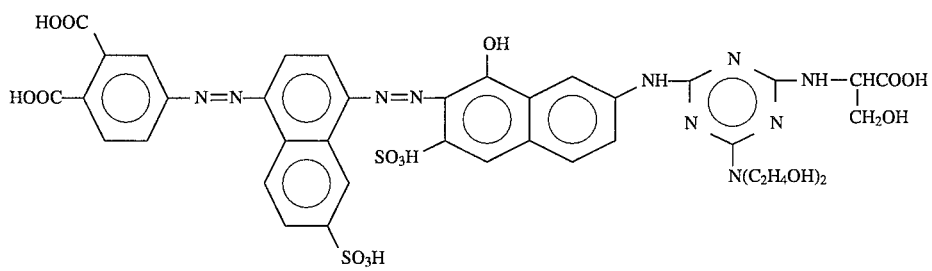
(I)-(21)
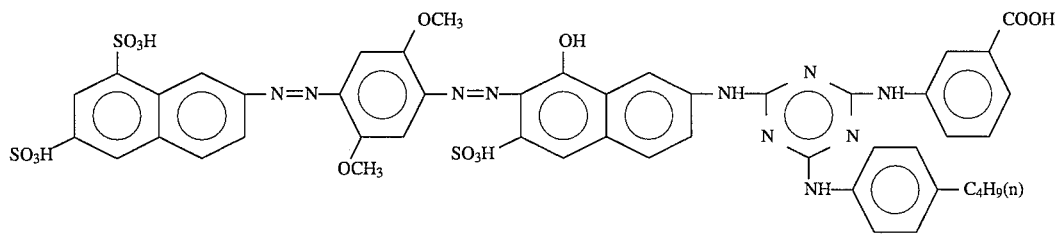
(I)-(22)
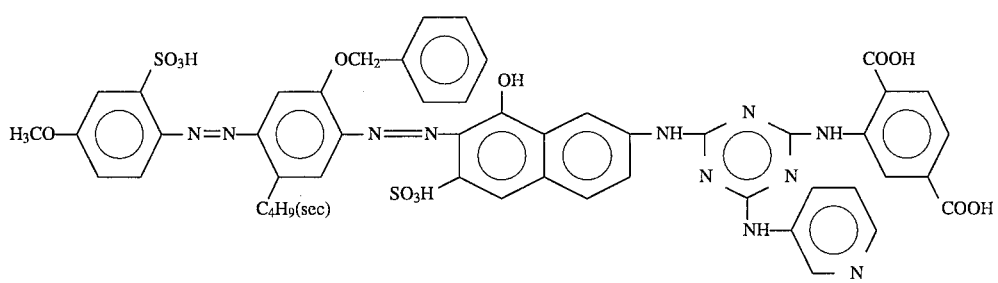
(I)-(23)
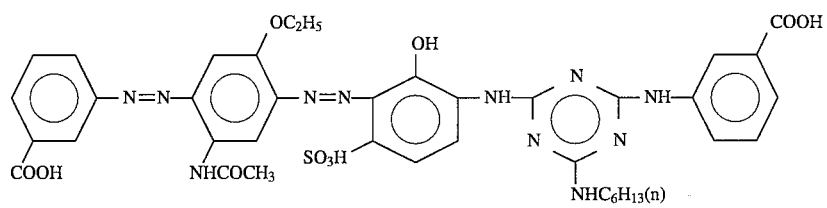
(I)-(24)

The azo dyes represented by formula (I) can be prepared by the process which per se is known in the art.

For example, the dye represented by (I)-(1) above can be produced according to the following steps (A) to (D):

(A) A monoazo compound is produced from 3-aminobenzoic acid and 2,5-diethoxyaniline through diazotization and coupling steps according to a conventional method (for example, Yutaka Hosoda, *Shin Senryo Kagaku* (New Dye Chemistry), pages 396–409, published by Gihodo, Dec. 21, 1973).

(B) A dis-azo compound is produced from the monoazo compound obtained in (A) and 7-amino-1-hydroxy-3-sulfonic acid (γ acid) through diazotization and coupling steps according to a conventional method.

(C) The dis-azo compound obtained in (B) is added to a cyanuric chloride while maintaining at a pH of 4 to 6 and a temperature of from 0° to 5° C., followed by allowing to react for several hours. Then, an aqueous solution of 3-aminobenzoic acid is added thereto at room temperature so as not to render the mixture alkaline, and a condensation reaction is conducted for several hours. A solution of n-hexylamine is added thereto at 50° to 60° C., and a condensation reaction is conducted for several hours to complete the reaction.

(D) The reaction solution obtained in (C) is cooled and salted out with a 20% aqueous sodium chloride solution to obtain the desired dye of (I)-(1).

2. Dyes of Formula (II)

The phenylene group represented by C may have one or more substituents selected from the group consisting of a substituted or unsubstituted alkyl group having from 1 to 7 carbon atoms, a substituted or unsubstituted alkoxy group having from 1 to 9 carbon atoms, an amino group, a carboxyl group, a hydroxyl group, a sulfo group and a halogen atom. Examples of the alkyl group include a methyl group, an ethyl group, a propyl group, a butyl group, a pentyl group, a hexyl group and a heptyl group, and these groups may be a straight chain or a branched chain, and may have a substituent, for example, a phenyl group, a hydroxyl group, an alkoxy group, a halogen atom such as a chlorine atom, a bromine atom or a fluorine atom. Examples of the alkoxy group include the alkoxy group having from 1 to 7 carbon atoms which corresponds to the above-described alkyl group, an octyloxy group and an nonyloxy group, and the alkyl moiety of these alkoxy groups may be a straight chain or a branched chain, and may have a substituent as set forth above for the alkyl group. Examples of the halogen atom include a chlorine atom, a bromine atom and a fluorine atom, and a chlorine atom is preferred. Of these substituents, particularly preferred substituents are one or two substituents selected from a lower alkyl group and a lower alkoxy group, and more preferably a lower alkoxy group. The term "lower" as used herein means 1 to 4 carbon atoms.

The phenylene group represented by C preferably has the above-described substituents. The number of the substituents is preferably one or two, and more preferably two. Further, the position of these substituents is preferably, 2- and/or 5-position of benzene ring relative to the amino group. When the phenylene group has two substituents, these substituents may be the same or different. Accordingly, a particularly preferred group represented by C is a 1,4-phenylene group having a lower alkoxy group at least one of the 2- and 5-positions thereof.

In formula (II), the groups represented by $X_1$ and $Y_1$ include a hydrogen atom, and the same straight chain or branched chain alkyl group having from 1 to 7 carbon atoms or straight chain or branched chain alkoxy group having from 1 to 9 carbon atoms as those described for the substituents of C above. In $X_1$ and $Y_1$, substituents of the alkyl group include an alkoxy group, a hydroxyl group and a phenyl group, and substituents of the alkoxy group include an alkoxy group, a hydroxyl group, a phenyl group and a benzyloxy group. It is required that the sum of the carbon atoms in $X_1$ and $Y_1$ is 5 or more. When one of $X_1$ and $Y_1$ is a hydrogen atom, the other should have 5 or more carbon atoms, including the number of carbon atoms in substituents, if any, on $X_1$ or $Y_1$. Further, in the present invention, n1 is preferably 0. By using the dye having the sum of carbon atoms in $X_1$ and $Y_1$ of 5 or more, a recording liquid having a high recording density and a good storage stability can be obtained as shown in Examples and Comparative Examples hereinafter described.

Specific examples of the dye of the general formula (II) include azo dyes shown by the following structures (II)-(1) to (II)-(20), and these dyes can be used singly or in combination depending upon the desired color tone.

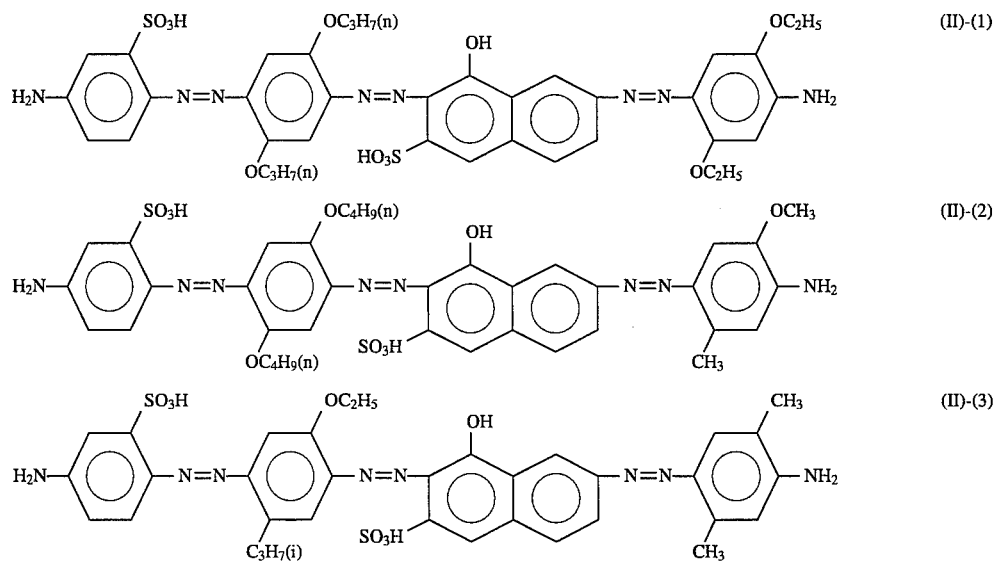

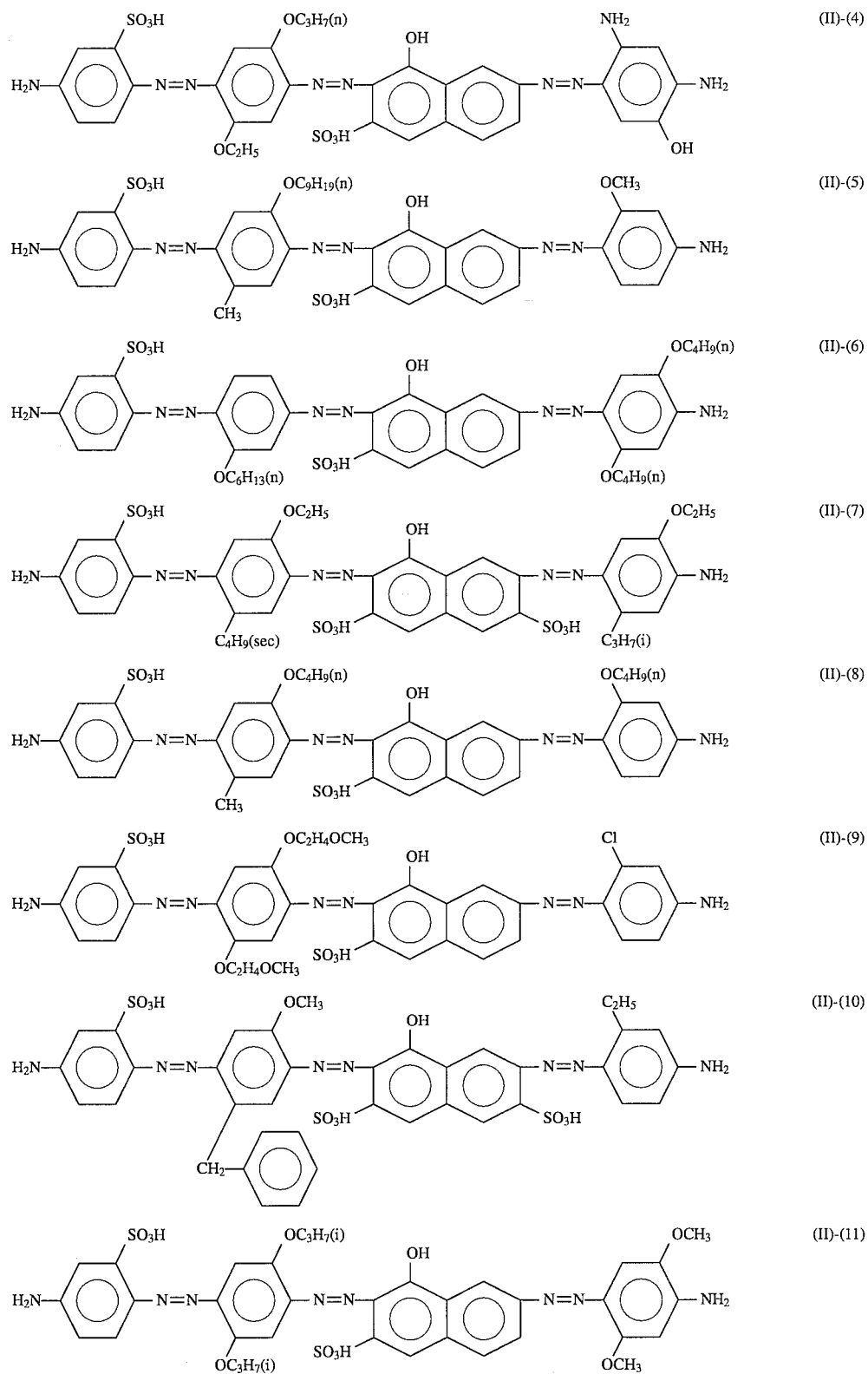

-continued
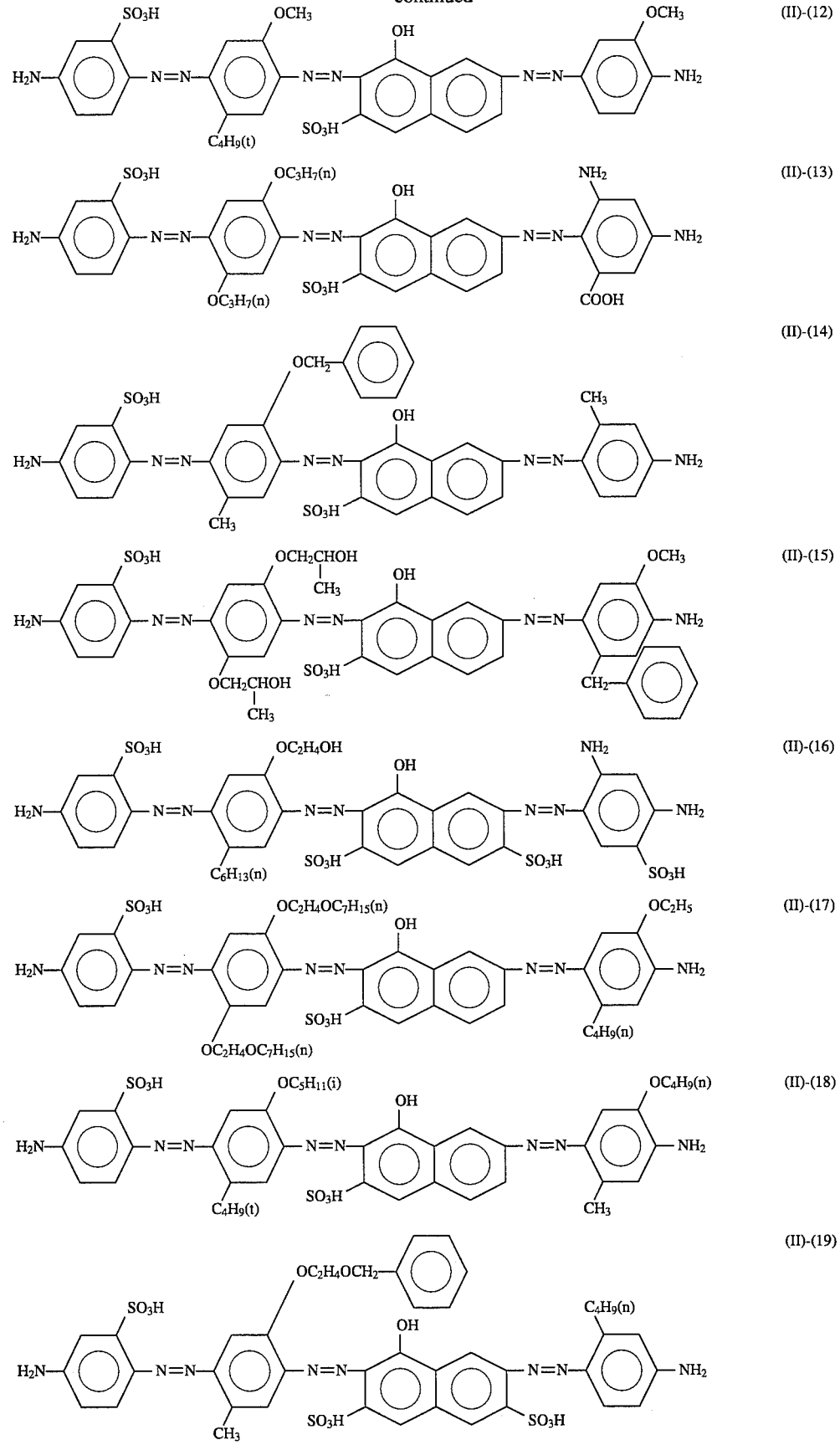

-continued

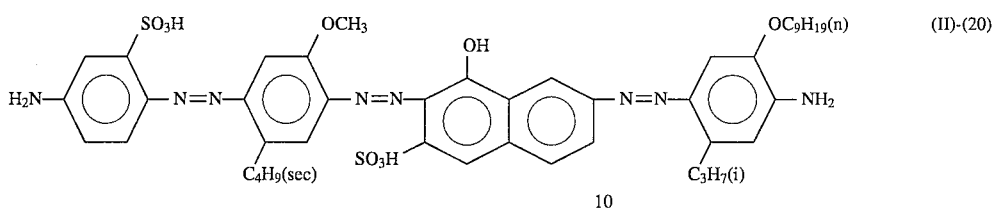
(II)-(20)

The azo dyes represented by formula (II) can be prepared by the process which per se is known in the art through diazotization and coupling steps according to a conventional method (for example, Yutaka Hosoda, *Shin Senryo Kagaku* (New Dye Chemistry), pages 396–409, published by Gihodo, Dec. 21, 1973).

3. Dyes of Formula (III)

Substituents for the phenyl group, the naphthyl group, the phenylene group or the naphthylene group represented by D and E include a sulfo group (—SO$_3$H), a carboxyl group (—COOH), an amino group, an acylamino group such as an acetylamino group, a benzoylamino group or an arylcarbonylamino group, a substituted or unsubstituted alkyl group having from 1 to 9 carbon atoms (for example, an unsubstituted alkyl group such as a methyl group, an ethyl group, an n-propyl group, an isopropyl group and an n-butyl group, a halogen-substituted alkyl group such as a trifluoromethyl group, and an alkyl group having an amino group which may be substituted such as a dimethylaminomethyl group), a substituted or unsubstituted alkoxy group having from 1 to 9 carbon atoms (for example, an unsubstituted alkoxy group such as a methoxy group, an isopropoxy group and an n-butoxy group, and an alkoxy group substituted with a hydroxyl group, a lower alkoxy group, an aryl group or a carboxyl group such as a hydroxyethoxy group, a methoxyethoxy group, a benzoyloxy group and a carboxymethoxy group), a hydroxyl group or a halogen atom such as a chlorine atom, a bromine atom and a fluorine atom. A plurality of these substituents may be substituted. The phenylene group represented by E is preferably a 1,4-phenylene group which may be substituted with the above-described substituents, and the naphthylene group represented by E is preferably a 1,4-naphthylene group substituted with a sulfo group.

Examples of substituents on the alkyl group represented by X$_2$ and Y$_2$ include a phenyl group, and examples of substituents on the alkoxy group represented by X$_2$ and Y$_2$ include an alkoxy group, a hydroxyl group, a phenyl group a benzyloxy group and a carboxyl group.

The substituents represented by R$_5$, R$_6$, R$_7$ and R$_8$ each independently include a hydrogen atom, a substituted or unsubstituted alkyl group having from 1 to 18 carbon atoms (for example, an unsubstituted alkyl group such as a methyl group, an ethyl group, an n-propyl group, an isopropyl group, an n-butyl group, an n-octyl group and an ethylhexyl group, and a substituted alkyl group such as a hydroxyethyl group, an alkyl group having a carboxyl group such as a carboxypropyl group, a carboxycyclohexylmethyl group, a 1-carboxy-2-carbamoylethyl group, an 1-isopropyl-1-carboxymethyl group, a 1,2-dicarboxypropyl group, a 1-carboxy-2-mercaptoethyl group, a 1-carboxy-2-hydroxyethyl group and an aminoethyl group), a substituted or unsubstituted alkenyl group having from 1 to 18 carbon atoms (for example, 2-methyl-1-propenyl group, a vinyl group or an allyl group), a substituted or unsubstituted aryl group (for example, an unsubstituted phenyl group, an alkylphenyl group, a carboxyphenyl group or a dicarboxyphenyl group such as a phenyl group, a 3,4-dicarboxyphenyl group, a 4-butylphenyl group and a 4-carboxyphenyl group), a substituted or unsubstituted aralkyl group (for example, a benzyl group, a 1-carboxy-2-phenylethyl group, a 1-carboxy-2-hydroxyphenylethyl group and a 4-carboxybenzyl group), a substituted or unsubstituted cycloalkyl group (for example, a cyclohexyl group and a 4-carboxycyclohexyl group), a substituted or unsubstituted heterocyclic group (for example, a pyridyl group, a mercaptothiadiazolyl group, a benzothiazolyl group and a 2,2,6,6-tetramethylpiperidinyl group). Preferably, one of R$_5$ and R$_6$, and one of R$_7$ and R$_8$ each independently represents a hydrogen atom, and others each represents the group other than a hydrogen atom. In particular, it is preferred that at least one of R$_5$, R$_6$, R$_7$ and R$_8$ is substituted with 1 to 4 carboxyl groups.

In formula (III), the group represented by formula (V) is preferably bonded to the ortho- or para-position, more preferably to the para-position, relative to the azo group of the benzene ring, and further, this benzene ring (to which the group (V) is bonded) and X$_2$ and Y$_2$ substituted on the benzene ring preferably form a group represented by formula (VI):

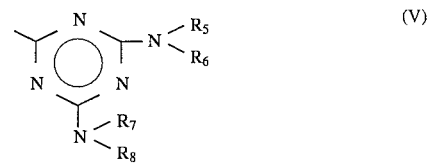
(V)

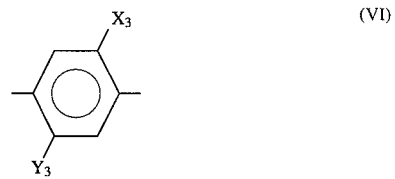
(VI)

wherein X$_3$ and Y$_3$ each independently represents a substituted or unsubstituted alkyl group having from 1 to 4 carbon atoms, a substituted or unsubstituted alkoxy group having from 1 to 4 carbon atoms or an acylamino group having from 2 to 7 carbon atoms, and X$_3$ may be a hydrogen atom.

Specific examples of the dyes of the general formula (III) are shown by the following structures (III)-(1) to (III)-(23), and these dyes can be used singly or in combination of two or more dyes depending upon the desired color tone.

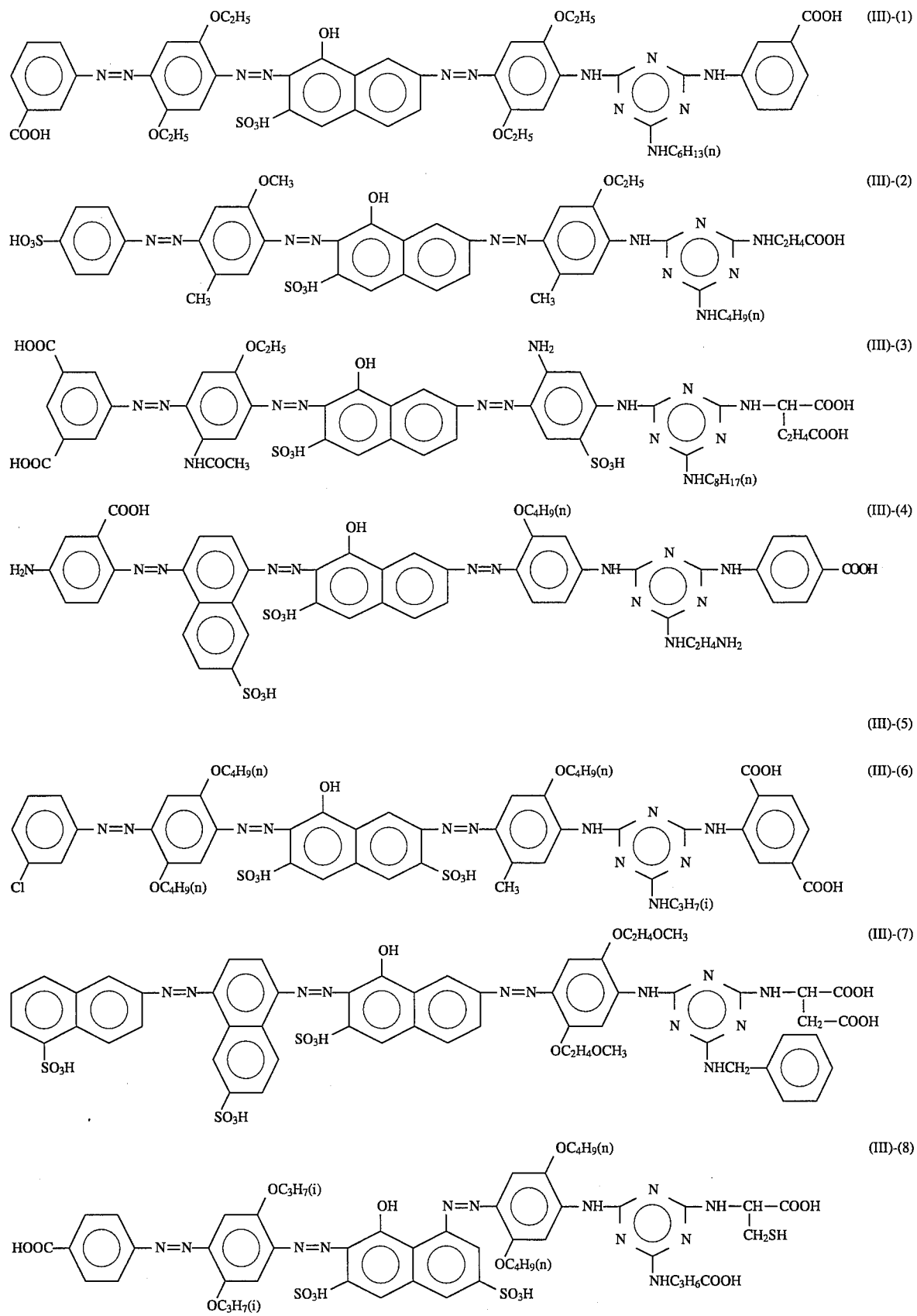

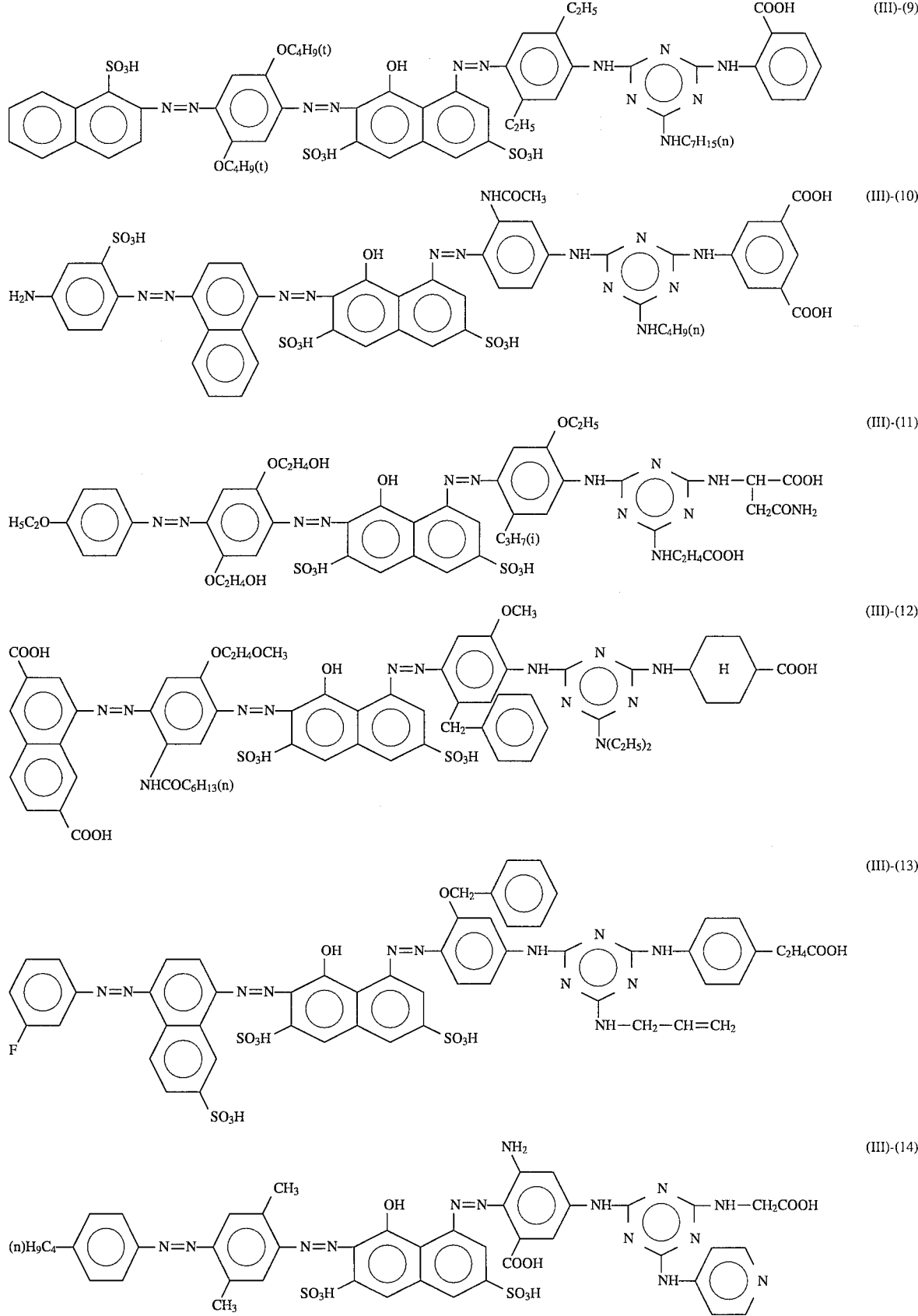

-continued
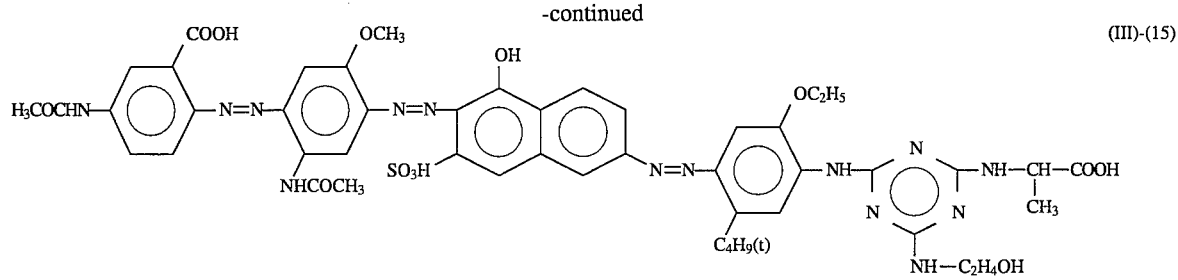
(III)-(15)
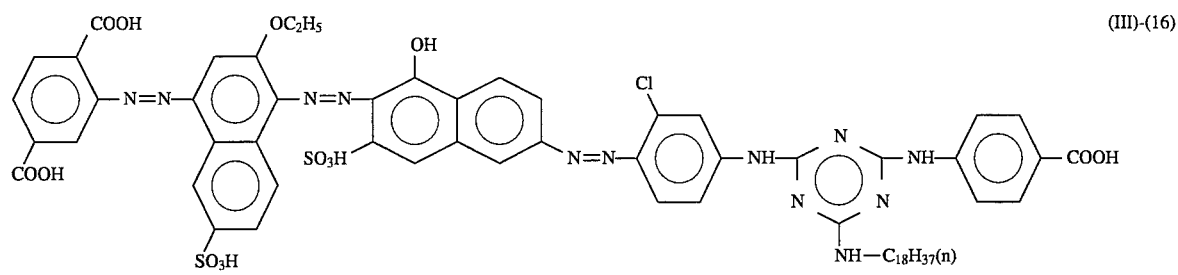
(III)-(16)
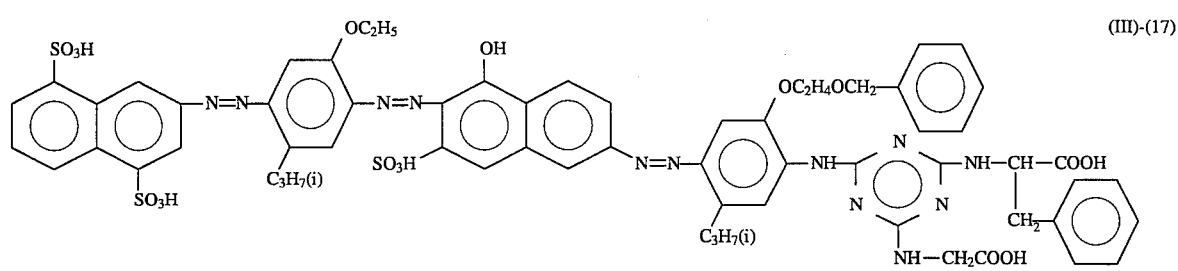
(III)-(17)
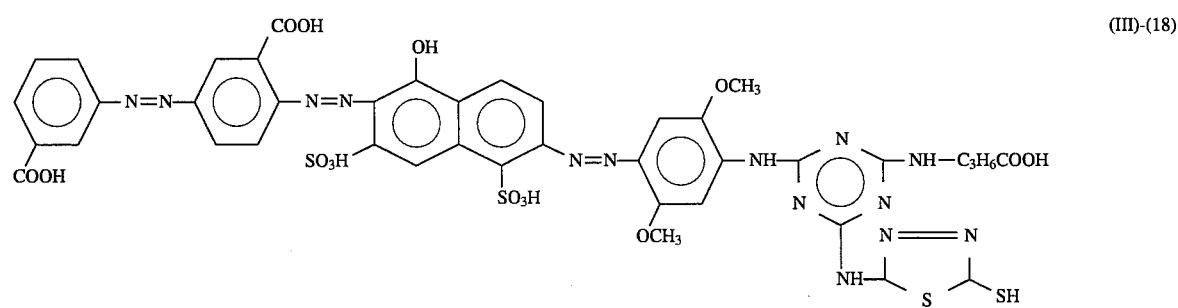
(III)-(18)
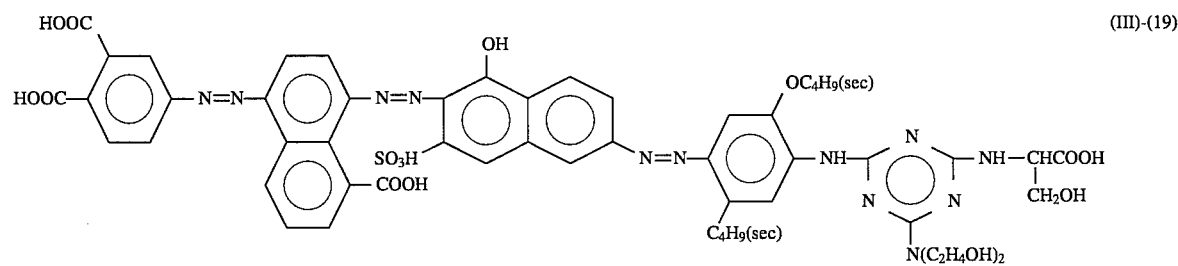
(III)-(19)
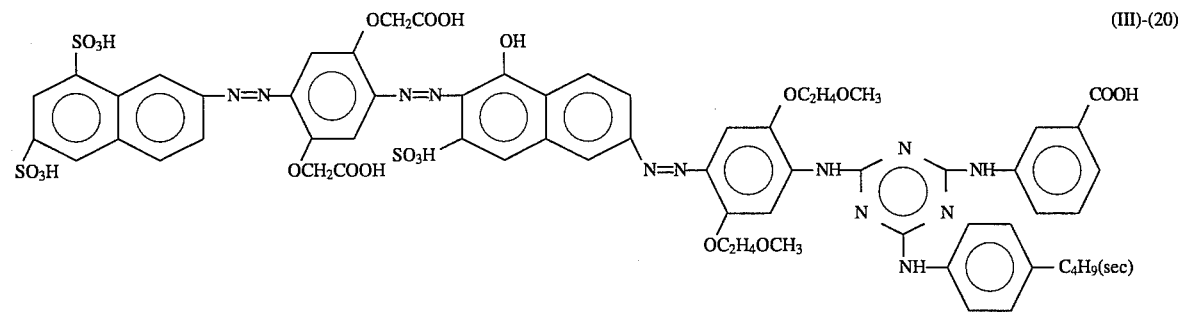
(III)-(20)

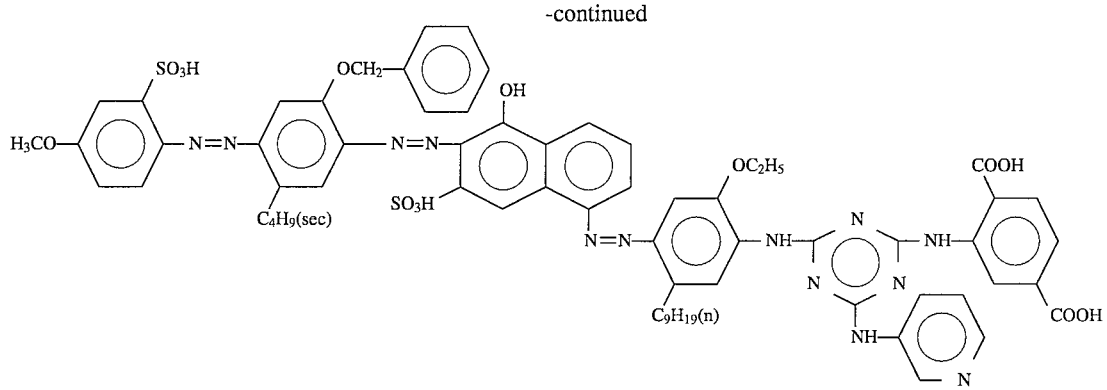

(III)-(21)

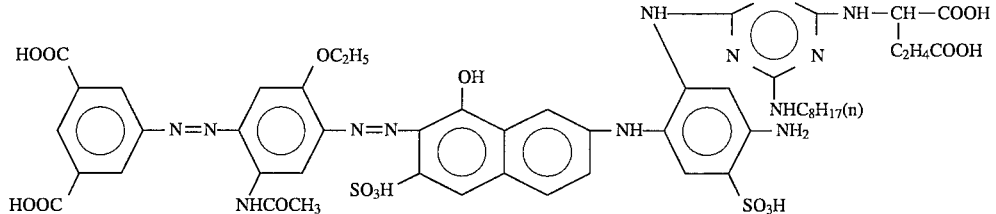

(III)-(22)

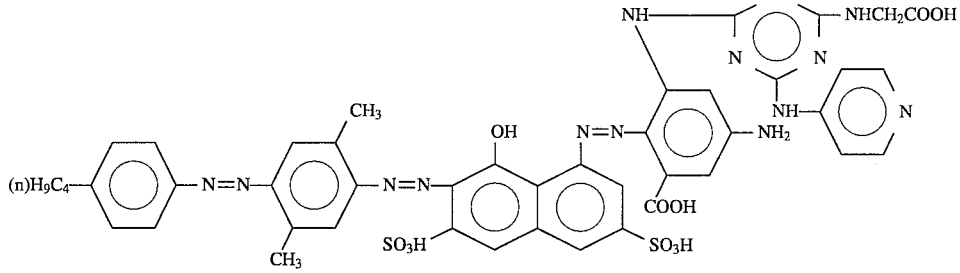

(III)-(23)

The azo dyes represented by formula (III) can be prepared by the process which per se is known in the art.

For example, the dye represented by (III)-(1) above can be produced according to the following steps (A) to (E):

(A) A monoazo compound is produced from 3-aminobenzoic acid and 2,5-diethoxyaniline through diazotization and coupling steps according to a conventional method (for example, Yutaka Hosoda, Shin *Senryo Kagaku* (New Dye Chemistry), pages 396–409, published by Gihodo, Dec. 21, 1973).

(B) A disazo compound is produced from the monoazo compound obtained in (A) and 7-amino-1-hydroxynaphthalene-3-sulfonic acid (γ acid) through diazotization and coupling steps according to a conventional method.

(C) A trisazo compound is produced from the disazo compound obtained in (B) and 2,5-diethoxyaniline through diazotization and coupling steps according to a conventional method.

(D) The trisazo compound obtained in (C) is added to a cyanuric chloride while maintaining at a pH of 4 to 6 and a temperature of from 0° to 5° C., followed by allowing to react for several hours. Then, an aqueous solution of 3-aminobenzoic acid is added thereto at room temperature so as not to render the mixture alkaline, and a condensation reaction is conducted for several hours. Then, a solution of n-hexylamine is added thereto at 50° to 60° C., and a condensation reaction is conducted for several hours to complete the reaction.

(E) After cooling, the reaction solution obtained in (D) is salted out with a 20% aqueous sodium chloride solution to obtain the desired dye of (III)-(1).

4. Dyes of Formula (IV)

The phenyl group or the naphthyl group represented by F may have one or a plurality of substituents, for example, a sulfo group (—$SO_3H$), a carboxyl group (—COOH), an amino group, an acylamino group having from 2 to 7 carbon atoms (for example, an acetylamino group and a benzoylamino group), a substituted or unsubstituted alkyl group having from 1 to 9 carbon atoms (for example, a straight chain or branched chain alkyl group having from 1 to 9 carbon atoms such as a methyl group, an ethyl group, an n-propyl group, an isopropyl group and an n-butyl group, and the above-described alkyl group substituted with a fluorine atom or a substituted amino group, such as a trifluoromethyl group and a dimethylaminomethyl group), a substituted or unsubstituted alkoxy group having from 1 to 4 carbon atoms (for example, a straight chain or branched chain alkoxy group having from 1 to 4 carbon atoms such as a methoxy group, an ethoxy group, an isopropoxy group and an n-butoxy group, and the above-described alkoxy group in which the alkyl moiety thereof is substituted with a hydroxyl group or an alkoxy group, such as a hydroxyethoxy group and a methoxyethoxy group), a hydroxyl group, and a halogen atom such as a chlorine atom, a bromine atom or a fluorine atom. In the present invention, F is preferably a substituted group as described above rather than an unsubstituted group, and, in particular, the group substituted with at least one of a sulfo group and a carboxyl group is preferred, and a phenyl group having 1 or 2 carboxyl groups is more preferred.

Examples of substituents on the phenylene group represented by G include a sulfo group, a carboxy group, the above-described substituted or unsubstituted alkyl group having from 1 to 9 carbon atoms, the above-described alkoxy group having from 1 to 4 carbon atoms, and the above-described acylamino group having from 2 to 7 carbon atoms. In the present invention, when G represents, for example, a phenylene group having substituents, the phenylene group represented by formula (VIII) is preferred.

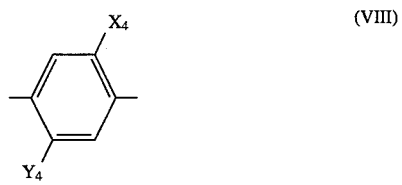

wherein $X_4$ and $Y_4$ each independently represents the above-described substituent, and one of $X_4$ and $Y_4$ may be a hydrogen atom and, in this case, $Y_4$ preferably represents a hydrogen atom.

When G represents a naphthylene group, a 1,4-naphthylene group substituted with a sulfo group is preferred.

$R_9$, $R_{10}$ and $R_{11}$ each independently represents a hydrogen atom, a substituted or unsubstituted alkyl group having from 1 to 18 carbon atoms (for example, a straight chain or branched chain alkyl group having from 1 to 18 carbon atoms such as a methyl group, an ethyl group, an n-butyl group, an n-octyl group and an ethylhexyl group, and the above-described alkyl group substituted with a hydroxyl group, a carboxyl group, a carboxycyclohexyl group, a mercapto group or a carbamoyl group, such as a hydroxyethyl group, a carboxypropyl group, carboxycylohexylmethyl group, a 1-carboxy-2-mercaptoethyl group, a 1-carboxy-2-carbamoylethyl group, a 1-isopropyl-1-carboxymethyl group and a 1,2-dicarboxypropyl group), a substituted or unsubstituted alkenyl group having from 1 to 18 carbon atoms (for example, a straight chain or branched chain alkenyl group such as a 2-methyl-1-propenyl group, a vinyl group or an allyl group, which may be substituted with a carboxyl group, a halogen atom or a hydroxyl group), an aryl group (for example, a phenyl group, or a phenyl group substituted with a carboxyl group or an alkyl group, such as a 3,4-dicarboxyphenyl group, a 4-butylphenyl group and a 4-carboxyphenyl group), an aralkyl group (for example, a phenylalkyl group having from 7 to 15 carbon atoms such as a benzyl group and a phenylethyl group, or the phenylalkyl group substituted with a carboxyl group or a hydroxyl group, such as a 1-carboxy-2-phenylethyl group, a 1-carboxy-2-hydroxyphenylethyl group and a 4-carboxybenzyl group), an alicyclic group such as a cycloalkyl group (for example, a cyclohexyl group, or a group substituted with a carboxyl group or a hydroxyl group, such as a 4-carboxycyclohexyl group), or a heterocyclic group (for example, a 5- to 6-membered ring containing 1 or 2 nitrogen atoms and/or sulfur atoms or a condensed ring thereof or a condensed ring thereof with a benzene ring, each of which may be substituted with an alkyl group or a carboxyl group, such as a pyridyl group, a thiadiazolyl group, a benzothiazolyl group and a 2,2,6,6-tetramethylpiperidinyl group).

In the present invention, at least one of $R_9$, $R_{10}$ and $R_{11}$ should be a group substituted with 1 to 4 carboxyl groups. Further, it is preferred that at least one of $R_9$ and $R_{10}$ is a hydrogen atom, and the other is a group selected from a substituted or unsubstituted alkyl group having from 1 to 4 carbon atoms, a substituted or unsubstituted alkoxy group having from 1 to 4 carbon atoms, an aryl group and a cyclohexyl group, and is a group substituted with a carboxyl group. The substituting position of the substituent including a triazinyl group represented by formula (VII) can be any position, but is preferably the 7- or 8-position of the 1-naphthol-3-sulfonic acid nucleus, more preferably the 7-position.

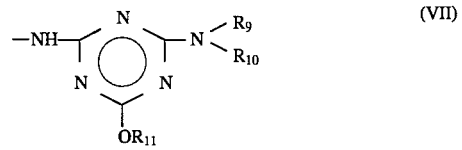

Specific examples of the dyes represented by the general formula (IV) include the azo dyes shown by the structural formulae (IV)-(1) to (IV)-(20), and these dyes can be used singly or in combination of two or more dyes depending upon the desired color tone.

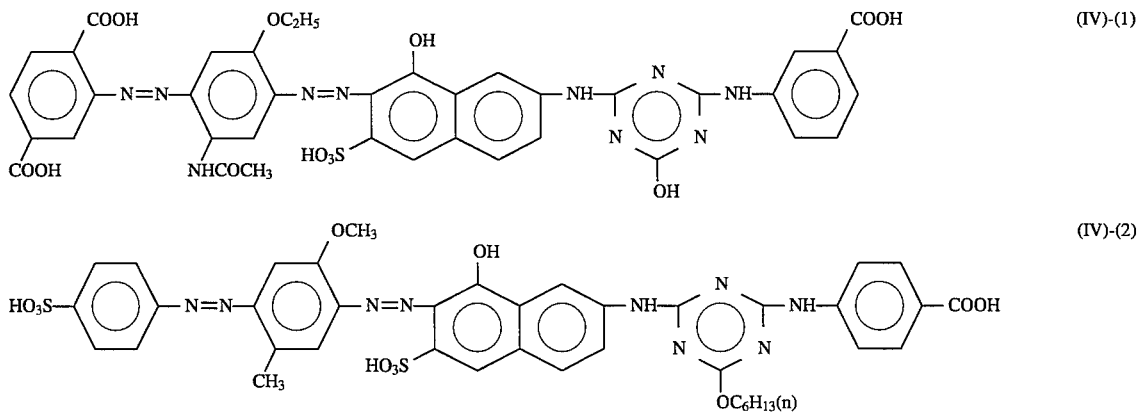

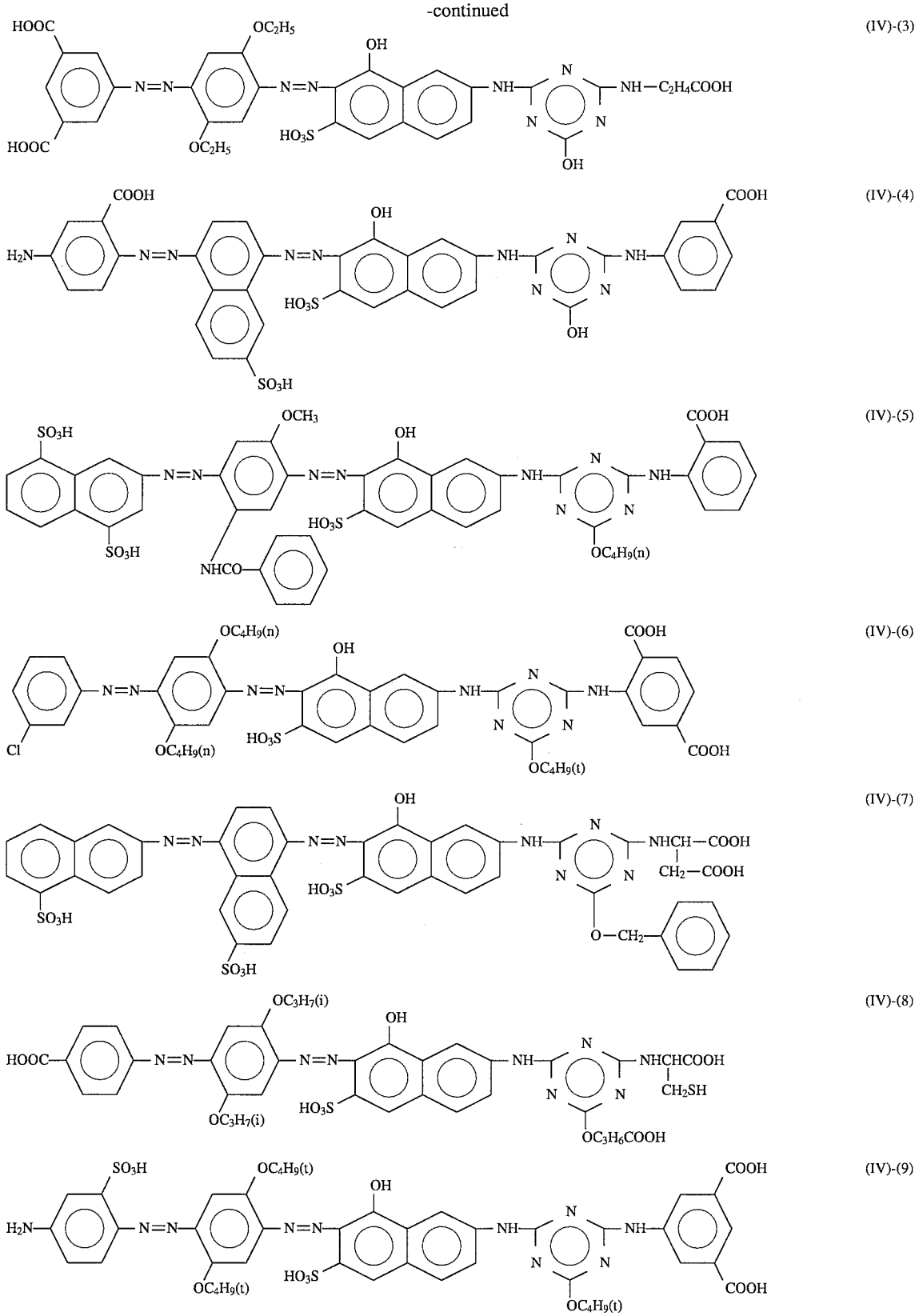

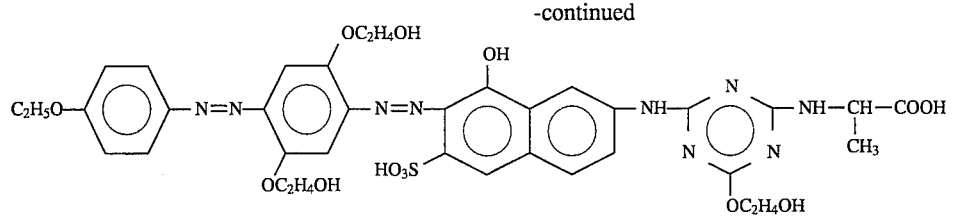 (IV)-(10)
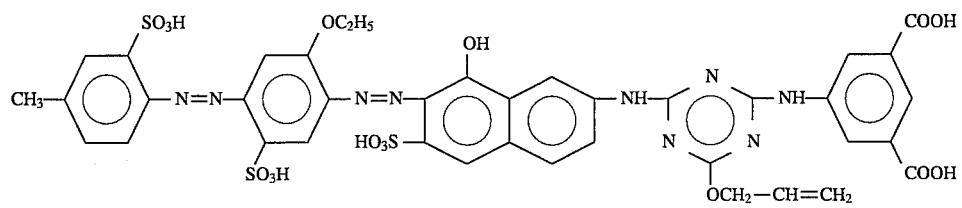 (IV)-(11)
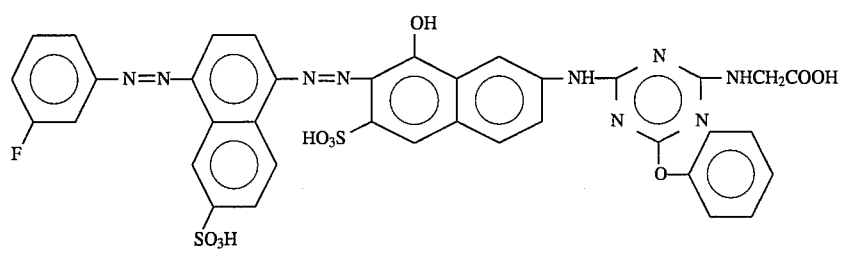 (IV)-(12)
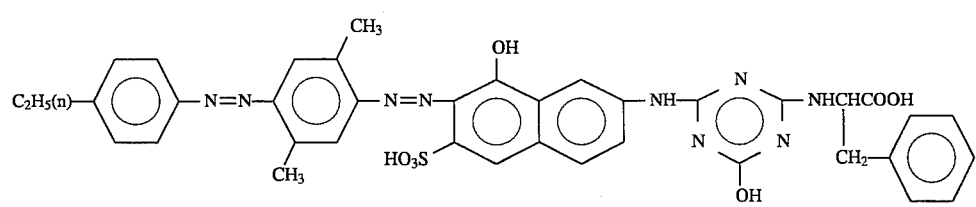 (IV)-(13)
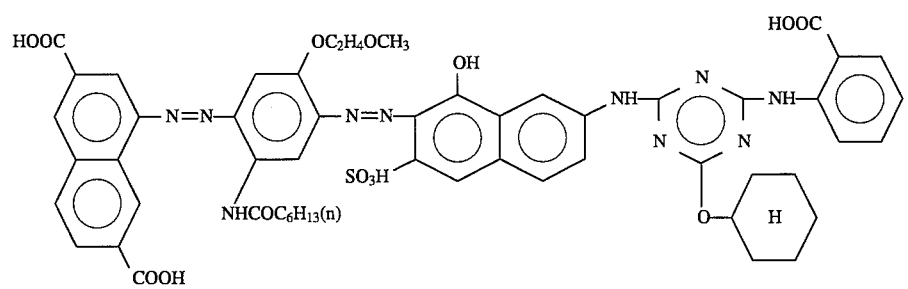 (IV)-(14)
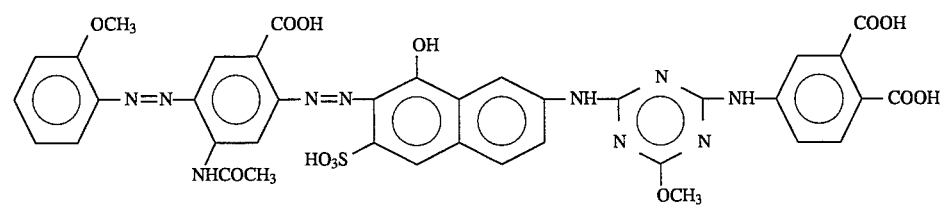 (IV)-(15)
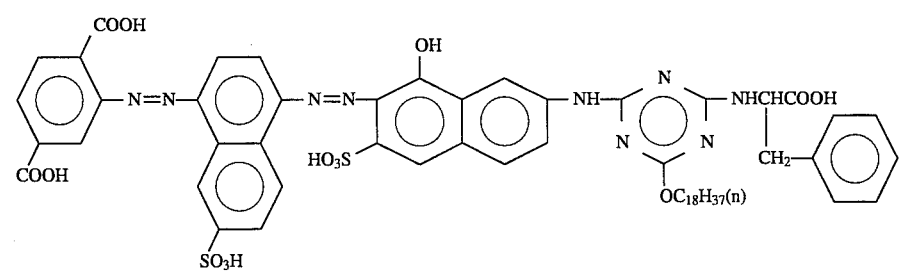 (IV)-(16)

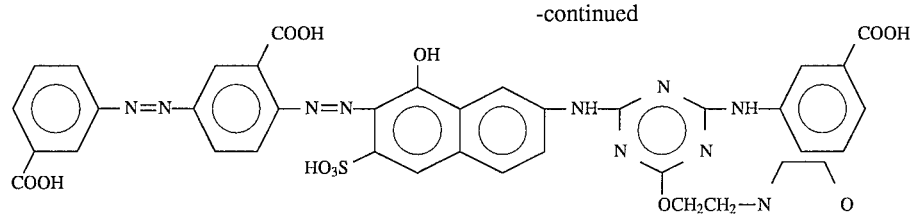

(IV)-(17)

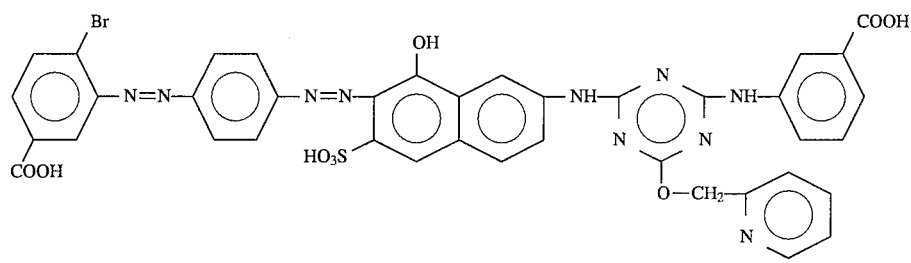

(IV)-(18)

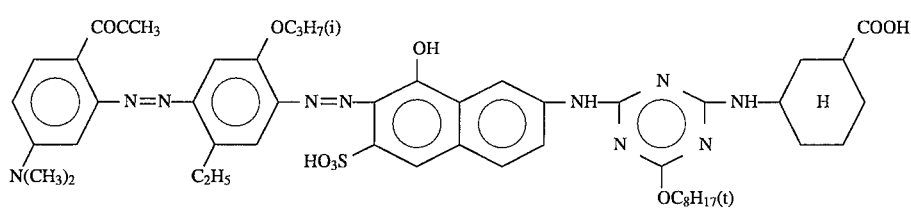

(IV)-(19)

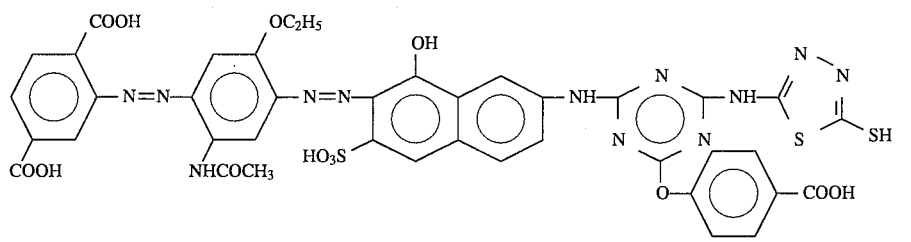

(IV)-(20)

The azo dyes represented by formula (IV) can be prepared by the process which per se is known in the art.

For example, the dye represented by (IV)-(1) above can be produced according to the following steps (A) to (D):

(A) A monoazo compound is produced from 2-aminoterephthalic acid and 3-amino-4-ethoxyacetoanilide through diazotization and coupling steps according to a conventional method (for example, Yutaka Hosoda, *Shin Senryo Kagaku* (New Dye Chemistry), pages 396–409, published by Gihodo, Dec. 21, 1973).

(B) A disazo compound is produced from the monoazo compound obtained in (A) and 7-amino-1-hydroxynaphthalene-3-sulfonic acid (γ acid) through diazotization and coupling steps according to a conventional method.

(C) The disazo compound obtained in (B) is added to a cyanuric chloride while maintaining at a pH of 4 to 6 and a temperature of from 0° to 5° C., followed by allowing to react for several hours. Then, an aqueous solution of 3-aminobenzoic acid is added thereto at room temperature so as not to render the mixture alkaline, and a condensation reaction is conducted for several hours. Then, an aqueous solution of sodium hydroxide is added thereto, and a condensation reaction is conducted at 60° to 70° C. for several hours under an alkaline condition to complete the reaction.

(D) The reaction solution obtained in (C) is cooled and then salted out with a 20% aqueous sodium chloride solution to obtain the desired dye of (IV)-(1).

The dye used in the present invention can be used in the form of its free acid represented by formulae (I), (II), (III) and (IV), but, if the dye is obtained in a salt form by the process of production thereof, the salt per se may be used. The salt form can be converted into any desired different salt form and then used. Further, acid groups in the molecule of the dye may be partially a salt form, and also a dye in the salt form and a dye in the free acid form may be used in combination. Examples of such salt forms include a salt with an alkali metal such as sodium, lithium and potassium, and an ammonium salt or a salt with an organic amine which may be substituted with, for example, an alkyl group or a hydroxyalkyl group. Examples of the organic amine include a lower alkylamine, a hydroxy-substituted lower alkylamine, a carboxy-substituted lower alkylamine and a polyamine having from 2 to 10 alkyleneimine units each having from 2 to 4 carbon atoms. In the case where the salt is used, the salt is not limited to a single form, and a mixture of different salt forms may be used.

The dyes represented by the general formulae (I), (II), (III) and (IV) may be used in combination with each other. Further, these dyes may be used in combination with dyes having chemical structures other than formulae (I), (II), (III) and (IV). In this case, the dyes having the structures other than formulae (I), (II), (III) and (IV) may be black color type dyes, and dyes having color tones other than black such as brown, red, yellow and blue type color dyes may also be used, if desired.

However, in the case where the dyes having structures other than formulae (I), (II), (III) and (IV), with respect to the performance other than the color tone, it is desirable that the dyes to be used in combination have a good performance to the same degree as that of the dyes represented by formulae (I), (II), (III) and (IV). In particular, dyes having excellent light-resistance and water-resistance are advantageously used. The proportion of the dyes to be used in combination is not specifically limited, and the dyes may be used in any range of proportion as long as the combination of dyes provides the desired black color.

The amount of the dye of the general formulae (I), (II), (III) and/or (IV) contained in the recording liquid can be generally from 0.5 to 5% by weight, preferably from 2 to 4% by weight, based on the total weight of the recording liquid.

Solvents used for the recording liquid of the present invention include water which preferably contains a water-soluble organic solvent, for example, ethylene glycol, propylene glycol, butylene glycol, diethylene glycol, triethylene glycol, polyethylene glycol (for example, a molecular weight of from 190 to 400), glycerin, N-methyl-pyrrolidone, N-ethyl-pyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol, isopropanol, diethanolamine, and triethanolamine. These water-soluble organic solvents are generally used in an amount from 10 to 50% by weight based on the total weight of the recording liquid. Water is generally used in an amount from 45 to 95% by weight based on the total weight of the recording liquid.

In the recording liquid of the present invention, a compound selected from urea, thiourea, biuret and semicarbazide can be added in an amount of from about 0.1 to about 10% by weight, preferably from 0.5 to 5% by weight, based on the total weight of the recording liquid, and also a surface active agent can be added in an amount of from about 0.001 to about 5.0% by weight in order to further improve the quick-drying property after recording an image and the quality of the recorded image.

The present invention is described hereinafter in greater detail by the following examples, but the present invention is not construed as being limited thereto.

EXAMPLE 1

Water was added to 10 parts by weight of diethylene glycol, 3 parts by weight of isopropyl alcohol and 3 parts by weight of the dye of (I)-1 shown above, and the mixture was adjusted to a pH of 9 with aqueous ammonia and adjusted the total weight to 100 parts by weight. The resulting composition was thoroughly mixed to dissolve it, and, after filtering under pressure through a Teflon (tradename) filter having a pore diameter of 1 μm, the mixture was degassed with a vacuum pump and an ultrasonic cleaning machine to prepare a recording liquid.

Using the resulting recording liquid, ink-jet recording was conducted on paper for electrophotography (a product of Xerox Co.) with an ink-jet printer (HG-3000, a trade name of Epson Co.) to obtain a black recorded image having a high density. Also, evaluations were conducted according to the following methods (a), (b) and (c), and the results obtained are shown in Table 1 below.

(a) Light-Resistance of Recorded Image:

Using a xenon fademeter (a product of Suga Shikenki Co.), the recorded paper was irradiated for 100 hours. The discoloration and fading after irradiation were found to be a small degree.

The light-resistance was evaluated for the following three grades: good (discloration was negligible), slightly poor (small discloration was observed), and poor (significant discloration was observed).

(b) Water-Resistance of Recorded Image:

(1) Test Method

After immersing the recorded paper in tap water for 5 minutes, (1) the image was visually observed for blurring, and (2) the optical density (OD) value in the solid image area before and after immersion was measured by a Macbeth densitometer (TR 927). The OD value (density of recorded image) before immersion was found to be as high as 1.33.

The visual evaluation was conducted for the following three grades: good (blurring was negligible), slightly poor (small blurring was observed), and poor (significant blurring was observed.

(2) Test Results

The blurring of the image as a result of the test (1) above was found to be slight. Changes in the density in the solid image area before and after immersion as a result of the test (2) above was found to be 91.2% in terms of the OD residual ratio calculated by the following formula:

$$OD \text{ residual Ratio } (\%) = \frac{OD \text{ Value after Immersion}}{OD \text{ Value before Immersion}} \times 100$$

(C) Storage Stability of Recording Liquid

The recording liquid was placed in sealed Teflon containers. After the recording liquid was stored for 1 month at 5° C. and 60° C., it was examined for any change. As a result, no precipitation of insoluble matter was observed in the recording liquid.

The storage stability was evaluated for the following three grades: good (deposition was negligible), sightly poor (small amount of deposition was observed), and poor (large amount of deposition was observed).

EXAMPLE 2

Water was added to 5 parts by weight of glycerin, 10 parts by weight of ethylene glycol and 2.5 parts by weight of the dye of (I)-8 shown above, and the mixture was adjusted to a pH of 9 with aqueous ammonia and adjusted to the total weight of 100 parts by weight. The resulting composition was worked up in the same manner as described in Example 1 to prepare a recording liquid. As a result of recording an image using the resulting recording liquid in the same manner as described in Example 1, a bluish black recorded image having a high density was obtained. The recorded image was evaluated according to (a) to (c) described in Example 1, and the results obtained are shown in Table 1 below. The OD residual ratio determined according to (b)(2) of Example 1 was 98.7%.

EXAMPLE 3

Water was added to 10 parts by weight of diethylene glycol, 5 parts by weight of N-methylpyrrolidone, 3 parts by weight of isopropyl alcohol and 3 parts by weight of the dye of (I)-16 shown above, and the mixture was adjusted to a pH of 9 with aqueous ammonia and adjusted to the total weight of 100 parts by weight. The resulting composition was worked up in the same manner as described in Example 1 to prepare a recording liquid. As a result of recording an image using the resulting recording liquid in the same manner as described in Example 1, a bluish black recorded image having a high density was obtained. The recorded image was evaluated according to (a) to (c) described in Example 1, and the results obtained are shown in Table 1 below. The OD residual ratio determined according to (b)(2) as in Example 1 was 94.3%.

COMPARATIVE EXAMPLE 1

A composition was prepared in the same manner as described in Example 1, except for using the dye of Example No. 8 disclosed in JP-A-3-100081 (Structural Formula (1) shown below) in place of the dye of (I)-1 used in Example 1, and the resulting composition was worked up in the same manner as in Example 1 to prepare a recording liquid. The recorded image obtained by using the resulting recording liquid was evaluated according to (a) to (c) described in Example 1, and the results obtained are shown in Table 1 below.

COMPARATIVE EXAMPLE 2

A composition was prepared in the same manner as described in Example 1, except for using the dye having the structural formula (2) shown below in place of the dye of (I)-1 used in Example 1, and the resulting composition was worked up in the same manner as in Example 1 to prepare a recording liquid. The recorded image obtained by using the resulting recording liquid was evaluated according to (a) to (c) described in Example 1, and the results obtained are shown in Table 1 below.

COMPARATIVE EXAMPLE 3

A composition was prepared in the same manner as described in Example 1, except for using the dye having the structural formula (3) shown below in place of the dye of (I)-1 used in Example 1, and the resulting composition was worked up in the same manner as in Example 1 to prepare a recording liquid. The recorded image obtained by using the resulting recording liquid was evaluated according to (a) to (c) described in Example 1, and the results obtained are shown in Table 1 below.

COMPARATIVE EXAMPLES 4 AND 5

A composition was prepared in the same manner as described in Example 1, except for using each of the dye described in No. 1 in JP-A-61-57666 (Structural Formula (4) shown below) and the dye of Dye No. 6 in Table 1 of JP-A-1-240584 (Structural Formula (5) shown below) in place of the dye of (I)-1 used in Example 1, and the resulting composition was worked up in the same manner as in Example 1 to prepare a recording liquid. The recorded image obtained by using the resulting recording liquid was evaluated according to (a) to (c) described in Example 1, and the results obtained are shown in Table 1 below.

Structural Formula (1):

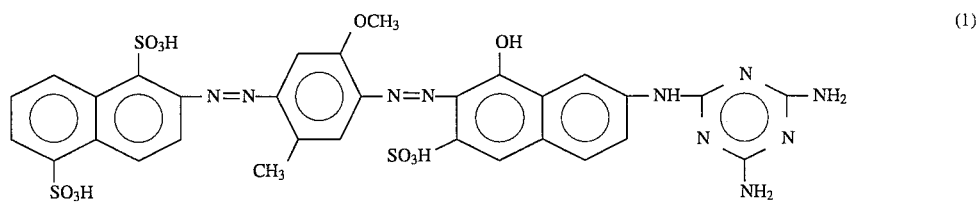

Structural Formula (2):

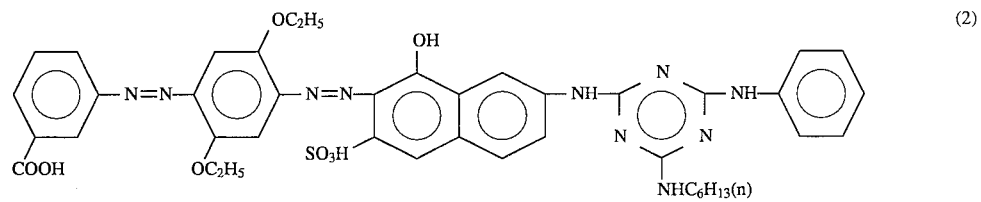

Structural Formula (3):

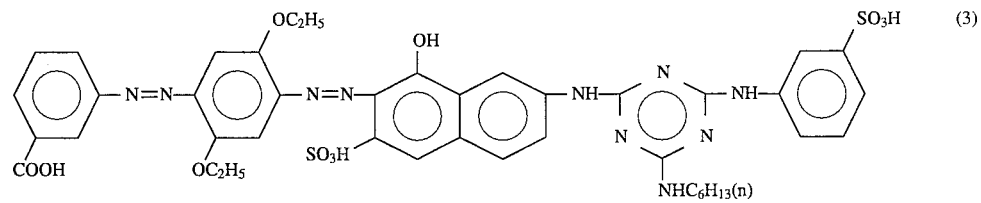

Structural Formula (4):

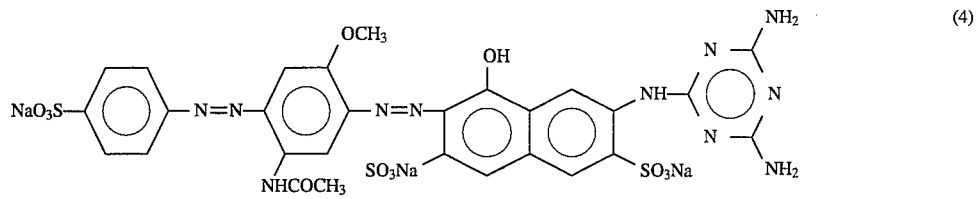

Structural Formula (5):

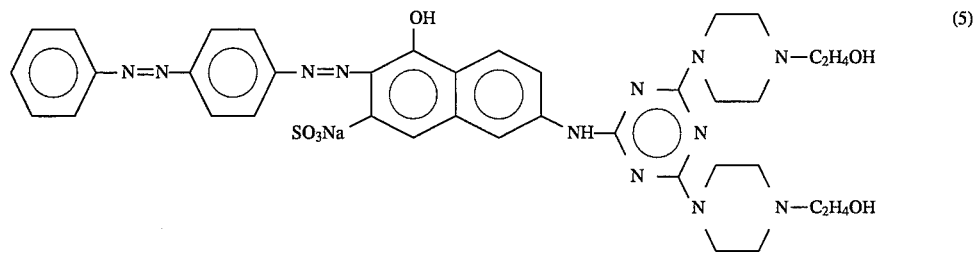

EXAMPLE 4

A composition was prepared in the same manner as described in Example 1, except for using the dye of (I)-14 shown above in place of the dye of (I)-1 used in Example 1, and the resulting composition was worked up in the same manner as in Example 1 to prepare a recording liquid. Using the resulting recording liquid, an image was recorded in the same manner as described in Example 1, and, as a result, a bluish black recorded image having a high density was obtained. The recorded image was evaluated according to (a) to (c) described in Example 1 and, as a result, good results similar to those of Example 1 were obtained in every test items. Also, the OD residual ratio was found to be 100.0%.

EXAMPLE 5

A composition was prepared in the same manner as described in Example 1, except for using the dye of (I)-20 shown above in place of the dye of (I)-1 used in Example 1, and the resulting composition was worked up in the same manner as in Example 1 to prepare a recording liquid. Using the resulting recording liquid, an image was recorded in the same manner as described in Example 1, and, as a result, a bluish black recorded image having a high density was obtained. The recorded image was evaluated according to (a) to (c) described in Example 1 and, as a result, good results similar to those of Example 1 were obtained in every test items. the OD residual ratio was found to be 100.0%.

TABLE 1

|  | Dye | (a) Light-resistance | (b) Water-resistance | | | (c) Storage stability | Tone |
|---|---|---|---|---|---|---|---|
|  |  |  | Visual evaluation | Density of image | OD residual ratio (%) |  |  |
| Example 1 | (I)-1 | A | A | 1.33 | 91.2 | A | Black |
| Example 2 | (I)-8 | A | A | 1.35 | 98.7 | A | Bluish black |
| Example 3 | (I)-16 | A | A | 1.30 | 94.3 | A | Bluish black |
| Comparative Example 1 | (1) | B | C | 1.28 | 67.3 | B | Bluish black |
| Comparative Example 2 | (2) | B | B | 1.31 | 83.2 | C | Bluish black |
| Comparative Example 3 | (3) | A | C | 1.25 | 70.4 | A | Bluish black |
| Comparative Example 4 | (4) | B | B | 1.27 | 65.8 | B | Bluish black |
| Comparative Example 5 | (5) | C | B | 0.71 | 82.3 | B | Red |

Note:
A: Good,
B: Slightly poor,
C: Poor

EXAMPLES 6 TO 24

A recording liquid was prepared in the same manner as described in Example 1, except for using each of the dyes of (I)-2 to (I)-7, (I)-9 to (I)-13, (I)-15, (I)-17 to (I)-19, and (I)-21 to (I)-24 shown above in place of the dye of (I)-1 used in Example 1. The recorded image obtained by using the resulting recording liquid was evaluated according to (a) to (c) described in Example 1, and, as a result, good results similar to those of Example 1 were obtained in every test items.

The OD residual ratios of the recording liquids using the dyes of (I)-2 and (I)-3 were 94.3% and 92.2%, respectively.

EXAMPLE 25

Water was added to 10 parts by weight of diethylene glycol, 5 parts by weight of N-methyl-2-pyrrolidone, 3 parts by weight of isopropyl alcohol, 1.5 parts by weight of the dye of (II)-11 shown above and 1.5 parts by weight of the dye of (I)-14 shown above, and the mixture was adjusted to a pH of 10 with an aqueous sodium hydroxide solution and adjusted to the total weight of 100 parts by weight. The resulting composition was worked up in the same manner as described in Example 1 to prepare a recording liquid. Using the resulting recording liquid, an image was recorded in the same manner as described in Example 1, and, as a result, a black recorded image having a high density was obtained. The recorded image was evaluated according to (a) to (c) described in Example 1. As a result, good results similar to those of Example 1 were obtained in every test items. The OD residual ratio was 98.5%, and the density of the recorded image was 1.43.

EXAMPLE 26

Water was added to 10 parts by weight of diethylene glycol, 3 parts by weight of isopropyl alcohol and 3 parts by weight of the dye of (II)-1 shown above, and the mixture was adjusted to a pH of 10 with an aqueous sodium hydroxide solution and adjusted the total weight to 100 parts by weight. The resulting composition was thoroughly mixed to dissolve it, and, after filtering under pressure through a Teflon filter having a pore diameter of 1 μm, the mixture was degassed with a vacuum pump and an ultrasonic cleaning machine to prepare a recording liquid.

Using the resulting recording liquid, ink-jet recording was conducted in the same manner as described in Example 1 to obtain a black recorded image having a high density. Also, evaluations were conducted according to the methods (a), (b) and (c) described in Example 1, and the results obtained are shown in Table 2 below.

EXAMPLE 27

Water was added to 5 parts by weight of glycerin, 10 parts by weight of ethylene glycol and 2 parts by weight of the dye of (II)-2 shown above, and the mixture was adjusted to a pH of 10 with an aqueous sodium hydroxide solution and adjusted the total weight to 100 parts by weight. The resulting composition was worked up in the same manner as described in Example 1 to prepare a recording liquid. Using the resulting recording liquid, a black recorded image was obtained in the same manner as in Example 1. The resulting recorded image was evaluated according to the methods (a), (b) and (c) described in Example 1, and the results obtained are shown in Table 2 below.

EXAMPLE 28

Water was added to 10 parts by weight of diethylene glycol, 5 parts by weight of N-methylpyrrolidone, 3 parts by weight of isopropyl alcohol and 3 parts by weight of the dye of (II)-3 shown above, and the mixture was adjusted to a pH of 10 with an aqueous sodium hydroxide solution and adjusted the total weight to 100 parts by weight. The resulting composition was worked up in the same manner as described in Example 1 to prepare a recording liquid. Using the resulting recording liquid, a black recorded image was obtained in the same manner as in Example 1. The resulting recorded image was evaluated according to the methods (a), (b) and (c) described in Example 1, and the results obtained are shown in Table 2 below.

COMPARATIVE EXAMPLE 6

A composition was prepared in the same manner as described in Example 26, except for using the dye having the structural formula (6) shown below in place of the dye of (II)-1 used in Example 26, and the resulting composition was worked up in the same manner as in Example 26 to prepare a recording liquid. The recorded image obtained by using the resulting recording liquid was evaluated according to (a) to (c) described in Example 1, and the results obtained are shown in Table 2 below.

COMPARATIVE EXAMPLE 7

A composition was prepared in the same manner as described in Example 26, except for using the dye having the structural formula (7) shown below in place of the dye of (II)-1 used in Example 26, and the resulting composition was worked up in the same manner as in Example 1 to prepare a recording liquid. The recorded image obtained by using the resulting recording liquid was evaluated according to (a) to (c) described in Example 1, and the results obtained are shown in Table 2 below.

Structural Formula (6):

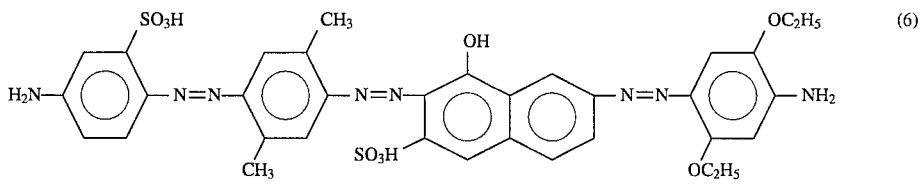

Structural Formula (7):

-continued

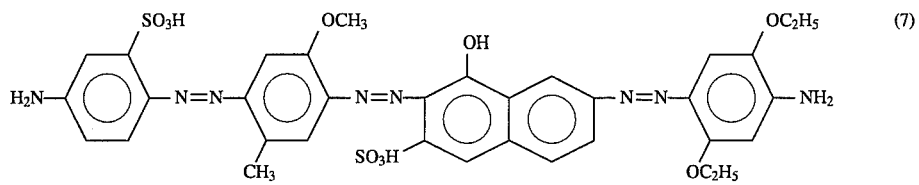

TABLE 2

| | Dye | a) Light-resistance | (b) Water-resistance | | c) Storage stability |
| | | | Visual evaluation | Density of image | OD residual ratio (%) | |
| --- | --- | --- | --- | --- | --- | --- |
| Example 26 | (II)-1 | A | A | 1.42 | 93.3 | A |
| Example 27 | (II)-2 | A | A | 1.33 | 95.3 | A |
| Example 28 | (II)-3 | A | A | 1.37 | 95.9 | A |
| Comparative Example 6 | (6) | B | A | 1.09 | 95.5 | B |
| Comparative Example 7 | (7) | A | A | 1.13 | 92.2 | B |

Note:
A: Good,
B: Slightly poor,
C: Poor

EXAMPLES 29 TO 45

A recording liquid was prepared in the same manner as described in Example 26, except for using each of the dyes of (II)-4 to (II)-20 shown above in place of the dye of (II)-1 used in Example 26. The recorded image obtained by using the resulting recording liquid was evaluated according to (a) to (c) described in Example 1, and, as a result, good results similar to those of Example 1 were obtained in every test items.

EXAMPLE 46

A recording liquid was prepared in the same manner as described in Example 1, except for using the dye of (III)-1 shown above in place of the dye of (I)-1 used in Example 1. Using the resulting recording liquid, an image was recorded in the same manner as described in Example 1, and, as a result, a black recorded image was obtained. The recorded image was evaluated according to (a) to (c) described in Example 1 and, as a result, good results similar to those of Example 1 were obtained in every test items. The density of the recorded image was found to be as high as 1.32, and the OD residual ratio as a result of (b) (2) water-resistance test was found to be 97.3%.

EXAMPLE 47

A recording liquid was prepared and an image was recorded in the same manner as described in Example 2, except for using the dye of (III)-8 shown above in place of the dye of (I)-8 used in Example 2, and a greenish black recorded image was obtained. The recorded image was evaluated according to (a) to (c) described in Example 1 and, as a result, good results similar to those of Example 1 were obtained in every test items. The density of the recorded image was found to be as high as 1.30, and the OD residual ratio as a result of (b)(2) water-resistance test was found to be 91.2%.

EXAMPLE 48

A recording liquid was prepared and an image was recorded in the same manner as described in Example 3, except for using the dye of (III)-16 shown above in place of the dye of (I)-16 used in Example 1, and a bluish black recorded image was obtained. The recorded image was evaluated according to (a) to (c) described in Example 1 and, as a result, good results similar to those of Example 1 were obtained in every test items. The density of the recorded image was found to be 1.27, and the OD residual ratio was found to be 90.5%.

EXAMPLE 49 TO 61

A recording liquid was prepared in the same manner as described in Example 1, except for using each of the dyes of (III)-2 to (III)-7, (III)-9 to (III)-15, (III)-17 to (III)-21 and (III)-23 shown above in place of the dye of (I)-1 used in Example 1, and an image was recorded using the resulting recording liquid in the same manner as described in Example 1. The recorded image was evaluated according to (a) to (c) described in Example 1 and, as a result, good results similar to those of Example 1 were obtained in every test items. The OD residual ratios of the recording liquids using the dye of (III)-2 and (III)-3 were found to be 85.3% and 97.4%, respectively.

EXAMPLE 62

A recording liquid was prepared in the same manner as described in Example 1, except for using the dye of (III)-22 shown above in place of the dye of (I)-1 used in Example 1. As a result of recording an image using the resulting recording liquid in the same manner as described in Example 1, a black recorded image having a density of the recorded image of 1.32 was obtained. The recorded image was evaluated according to (a) to (c) described in Example 1 and, as a result, good results similar to those of Example 1 were obtained in every test items. The OD residual ratio was found to be 98.2%.

EXAMPLE 63

A recording liquid was prepared in the same manner as described in Example 1, except for using the dye of (IV)-1 shown above in place of the dye of (I)-1 used in Example 1, and an image was recorded using the resulting recording liquid to obtain a black recorded image. The recorded image was evaluated according to (a) to (c) described in Example 1, and the results obtained are shown in Table 3 below.

EXAMPLE 64 TO 66

A recording liquid was prepared in the same manner as described in Example 1, except for using each of the dyes of (IV)-6, (IV)-13 and (IV)-18 shown above in place of the dye of (I)-1 used in Example 1, and an image was recorded using the resulting recording liquid to obtain a black recorded image. The recorded image was evaluated according to (a) to (c) described in Example 1, and the results obtained are shown in Table 3 below.

COMPARATIVE EXAMPLE 8

A composition was prepared in the same manner as described in Example 63, except for using C.I. Food Black 2 (FB-2) in place of the dye of (IV)-1 used in Example 63, and the resulting composition was worked up in the same manner as in Example 1 to prepare a recording liquid. The recorded image obtained by using the resulting recording liquid was evaluated according to (a) to (c) described in Example 1, and the results obtained are shown in Table 3 below.

COMPARATIVE EXAMPLE 9

A composition was prepared in the same manner as described in Example 63, except for using the dye described in No. 2 of Table 1 of JP-A-61-2776 (the structural formula (8) shown below) in place of the dye of (IV)-1 used in Example 63, and the resulting composition was worked up in the same manner as in Example 1 to prepare a recording liquid. The recorded image obtained by using the resulting recording liquid was evaluated according to (a) to (c) described in Example 1, and the results obtained are shown in Table 3 below.

Structural Formula (8):

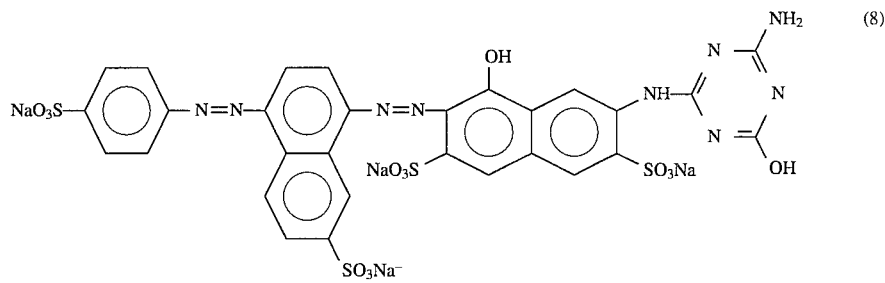

TABLE 3

|  | Dye | (a) Light-resistance | (b) Water-resistance | | | (c) Storage stability | Tone |
|---|---|---|---|---|---|---|---|
|  |  |  | Visual evaluation | Density of image | OD residual ratio (%) |  |  |
| Example 63 | (IV)-1 | A | A | 1.30 | 98.8 | A | Black |
| Example 64 | (IV)-6 | A | A | 1.28 | 93.4 | A | Black |
| Example 65 | (IV)-13 | A | A | 1.35 | 95.6 | A | Black |
| Example 66 | (IV)-18 | A | A | 1.30 | 92.5 | A | Black |
| Comparative Example 8 | FB-2 | B | C | 1.37 | 33.6 | A | Black |
| Comparative Example 9 | (8) | A | B | 1.25 | 71.4 | A | Bluish black |
| Comparative Example 4 | (4) | B | B | 1.27 | 65.8 | B | Bluish black |
| Comparative Example 5 | (5) | C | B | 0.71 | 82.3 | B | Red |

Note:
A: Good,
B; Slightly poor,
C: Poor

EXAMPLE 67

A recording liquid was prepared in the same manner as described in Example 2, except for using the dye of (IV)-3 shown above in place of the dye of (I)-8 used in Example 2. As a result of recording an image using the resulting recording liquid in the same manner as described in Example 1, a bluish black recorded image having a high density was obtained. The recorded image was evaluated according to (a) to (c) described in Example 1 and, as a result, good results similar to those of Example 1 were obtained in every test items. The OD residual ratio was found to be 95.2%.

EXAMPLE 68

A recording liquid was prepared in the same manner as described in Example 3, except for using the dye of (IV)-19 shown above in place of the dye of (I)-16 used in Example 3. As a result of recording an image using the resulting recording liquid in the same manner as described in Example 1, a bluish black recorded image was obtained. The recorded image was evaluated according to (a) to (c) described in Example 1 and, as a result, good results similar to those of Example 1 were obtained in every test items. The OD residual ratio was found to be 93.2%.

EXAMPLE 69 TO 82

A recording liquid was prepared in the same manner as described in example 63, except for using each of the dyes of (IV)-2, (IV)-4, (IV)-5, (IV)-7 to (IV)-12, (IV)-14 to (IV)-17 and (IV)-20 shown above in place of the dye of (IV)-1 used in Example 63, and an image was recorded using the resulting recording liquid. The recorded image was evaluated according to (a) to (c) described in Example 1 and, as a result, good results similar to those of Example 1 were obtained in every test items. The OD residual ratios of the recording liquids using (IV)-2 and (IV)-5 were found to be 92.7% and 95.5%, respectively.

As stated in the foregoing, the recording liquid of the present invention can be used in the ink-jet recording and writing; when the recording liquid is used for recording on plane paper, can provide recorded images having a high density and excellent in light-resistance and, in particular, in water-resistance and color tone of recorded image; and can have good stability in storage for a long period of time.

While the invention has been described in detail and with reference to specific embodiments thereof, it will be apparent to one skilled in the art that various changes and modifications can be made therein without departing from the spirit and scope thereof.

What is claimed is:

1. A recording liquid comprising an aqueous medium and at least one dye selected from dyes, a free acid form of which is represented by formula (I), (II), (III) or (VI):

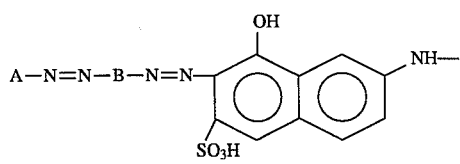
(I)

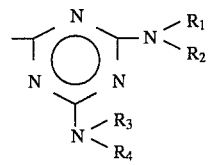

wherein A represents a phenyl group or a naphthyl group, each of which is substituted with at least one of a sulfo group and a carboxyl group and may have additional substituents; B represents a phenylene group which may be substituted with a sulfo group, a carboxyl group, a substituted or unsubstituted alkyl group having from 1 to 9 carbon atoms, a substituted or unsubstituted alkoxy group having from 1 to 4 carbon atoms or an acylamino group having from 2 to 7 carbon atoms, or a naphthylene group substituted with a sulfo group; and $R_1$, $R_2$, $R_3$ and $R_4$ each independently represents a hydrogen atom, an alkyl group having from 1 to 18 carbon atoms, an alkenyl group having from 1 to 18 carbon atoms, an aryl group, an aralkyl group, a cycloalkyl group or a heterocyclic group wherein each of these groups may have substituents and at least one of $R_1$, $R_2$, $R_3$ and $R_4$ represents a group substituted with a carboxyl group,

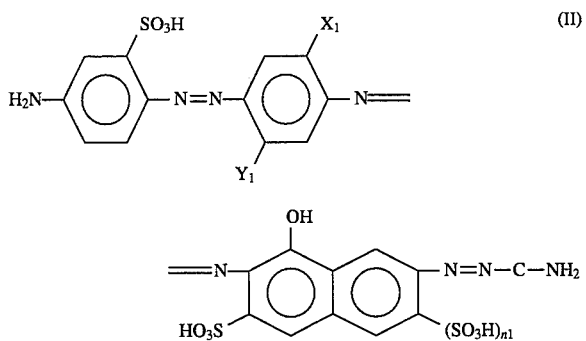

wherein C represents a phenylene group which may have one or more substituents selected from the group consisting of a substituted or unsubstituted alkyl group having from 1 to 7 carbon atoms, a substituted or unsubstituted alkoxy group having from 1 to 9 carbon atoms, an amino group, a carboxyl group, a hydroxyl group, a sulfo group and a halogen atom; $X_1$ and $Y_1$ each independently represents a hydrogen atom, a substituted or unsubstituted alkyl group having from 1 to 7 carbon atoms or a substituted or unsubstituted alkoxy group having from 1 to 9 carbon atoms, and the sum of the carbon atoms in $X_1$ and $Y_1$ is 5-or more; and n1 represents 0 or 1,

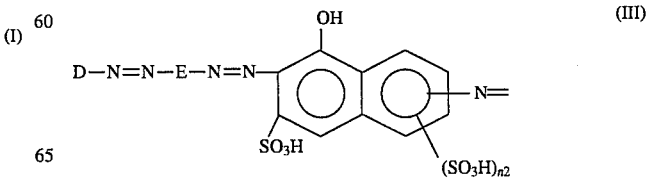
(III)

-continued

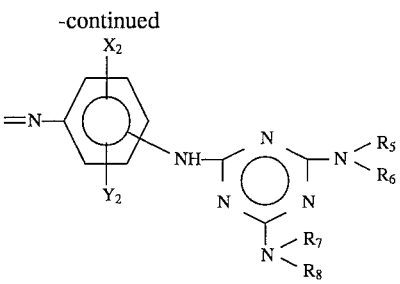

wherein D represents a substituted or unsubstituted phenyl group or a substituted or unsubstituted naphthyl group; E represents a substituted or unsubstituted phenylene group or a substituted or unsubstituted naphthylene group; $X_2$ and $Y_2$ each independently represents a hydrogen atom, an amino group, an acylamino group, a sulfo group, a carboxyl group, a halogen atom, a substituted or unsubstituted alkyl group having from 1 to 9 carbon atom or a substituted or unsubstituted alkoxy group having from 1 to 9 carbon atoms; $R_5$, $R_6$, $R_7$ and $R_8$ each independently represents a hydrogen atom, a substituted or unsubstituted alkyl group having from 1 to 18 carbon atom, a substituted or unsubstituted alkenyl group having from 1 to 18 carbon atoms, a substituted or unsubstituted aryl group, a substituted or unsubstituted aralkyl group, a substituted or unsubstituted cycloalkyl group, or a substituted or unsubstituted heterocyclic group; and n2 represents 0 or 1,

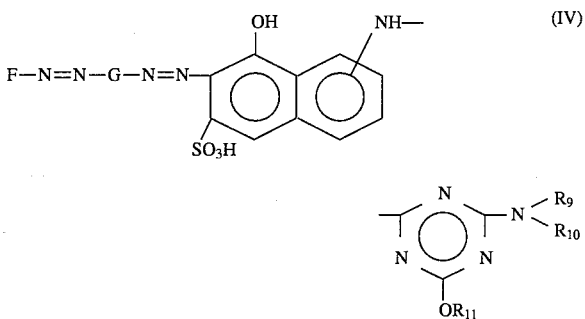

wherein F represents a substituted or unsubstituted phenyl group or a substituted or unsubstituted naphthyl group; G represents a phenylene group which may be substituted with a sulfo group, a carboxyl group, a substituted or unsubstituted alkyl group having from 1 to 9 carbon atoms, a substituted or unsubstituted alkoxy group having from 1 to 4 carbon atoms or an acylamino group having from 2 to 7 carbon atoms, or a naphthylene group substituted with a sulfo group; $R_9$, $R_{10}$ and $R_{11}$ each independently represents a hydrogen atom, a substituted or unsubstituted alkyl group having from 1 to 18 carbon atoms, a substituted or unsubstituted alkenyl group having from 1 to 18 carbon atoms, a substituted or unsubstituted aryl group, a substituted or unsubstituted aralkyl group, a substituted or unsubstituted alicyclic group or a substituted or unsubstituted heterocyclic group, and at least one of $R_9$, $R_{10}$ and $R_{11}$ represents a group substituted with 1 to 4 carboxyl groups.

2. A recording liquid as claimed in claim 1, wherein A in formula (I) represents a phenyl group or a naphthyl group, each of which has at least one of a sulfo group and a carboxyl group, and each of which may have a substituent selected from an amino group, an acylamino group having from 2 to 7 carbon atoms, a substituted or unsubstituted alkyl group having from 1 to 9 carbon atoms, a substituted or unsubstituted alkoxy group having from 1 to 4 carbon atoms, a hydroxyl group and a halogen atom.

3. A recording liquid as claimed in claim 1, wherein B in formula (I) represents a phenylene group having a substituent selected from a sulfo group, a carboxyl group, a substituted or unsubstituted alkyl group having from 1 to 9 carbon atoms, a substituted or unsubstituted alkoxy group having from 1 to 4 carbon atoms and an acylamino group having from 2 to 7 carbon atoms, or a naphthylene group substituted with a sulfo group.

4. A recording liquid as claimed in claim 1, wherein one of $R_1$ and $R_2$, and one of $R_3$ and $R_4$ in formula (I) each independently represents a hydrogen atom, and the others each represents a group selected from a substituted or unsubstituted alkyl group having from 1 to 18 carbon atoms, an aryl group, an aralkyl group, a cyclohexyl group and a heterocyclic group, and at least one of these groups is substituted with a carboxyl group.

5. A recording liquid as claimed in claim 1, wherein A in formula (I) represents a phenyl group having one carboxyl group.

6. A recording liquid as claimed in claim 1, wherein A in formula (I) represents a phenyl group having two carboxyl groups.

7. A recording liquid as claimed in claim 1, wherein B in formula (I) represents a phenylene group having one or two substituents selected from a substituted or unsubstituted alkyl group having from 1 to 4 carbon atoms, a substituted or unsubstituted alkoxy group having from 1 to 4 carbon atoms and an acylamino group having 2 to 7 carbon atoms.

8. A recording liquid as claimed in claim 1, wherein B in formula (I) represents a 1,4-naphthylene group having a sulfo group.

9. A recording liquid as claimed in claim 1, wherein C in formula (II) represents a phenylene group substituted with one or two substituents selected from a lower alkyl group and a lower alkoxy group.

10. A recording liquid as claimed in claim 1, wherein C in formula (II) represents a 1,4-phenylene group having a lower alkoxy group at least one of the 2- and 5-positions thereof.

11. A recording liquid as claimed in claim 1, wherein n1 in formula (II) is 0.

12. A recording liquid as claimed in claim 1, wherein the group represented by formula (V) in formula (III) is bonded to the para-position relative to the azo group of the benzene ring to which the group represented by formula (V) is bonded:

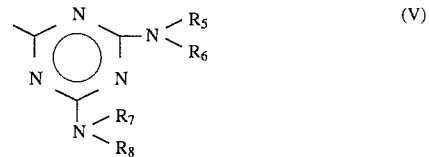

wherein $R_5$, $R_6$, $R_7$ and $R_8$ have the same meanings as in claim 1.

13. A recording liquid as claimed in claim 1, wherein D in formula (III) represents a phenyl group or a naphthyl group, each of which may be substituted with at least one of the substituents selected from a sulfo group, a carboxyl group, an amino group, an acylamino group having from 2 to 7 carbon atoms, a substituted or unsubstituted alkyl group having from 1 to 9 carbon atoms, a substituted or unsubstituted alkoxy group having from 1 to 9 carbon atoms, a hydroxyl group and a halogen atom.

14. A recording liquid as claimed in claim 1, wherein E in formula (III) represents a 1,4-phenylene group which may be substituted with at least one of the substituents selected from a sulfo group, a carboxyl group, an amino group, an acylamino group having from 2 to 7 carbon atoms, a substituted or unsubstituted alkyl group having from 1 to 9 carbon atoms, a substituted or unsubstituted alkoxy group having from 1 to 9 carbon atoms, a hydroxyl group and a halogen atom, or a 1,4-naphthylene group substituted with a sulfo group.

15. A recording liquid as claimed in claim 1, wherein $X_2$, $Y_2$ and the benzene ring, to which $X_2$ and $Y_2$ are bonded, in formula (III) form a group represented by formula (VI):

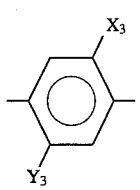

(VI)

wherein $X_3$ and $Y_3$ each independently represents a substituted or unsubstituted alkyl group having from 1 to 4 carbon atoms, a substituted or unsubstituted alkoxy group having from 1 to 4 carbon atoms or an acylamino group having from 2 to 7 carbon atoms, and $X_3$ may be a hydrogen atom.

16. A recording liquid as claimed in claim 1, wherein one of $R_5$ and $R_6$, and one of $R_7$ and $R_8$ in formula (III) each independently represents a hydrogen atom, and the others each independently represents a substituted or unsubstituted alkyl group, an alkenyl group having from 1 to 18 carbon atoms, a substituted or unsubstituted aryl group, a substituted or unsubstituted aralkyl group, a substituted or unsubstituted cycloalkyl group or a substituted or unsubstituted heterocyclic group, and one of $R_5$, $R_6$, $R_7$ and $R_8$ is a group having a carboxyl group as a substituent.

17. A recording liquid as claimed in claim 1, wherein n2 in formula (III) is 0.

18. A recording liquid as claimed in claim 1, wherein, in formula (IV), the group represented by formula (VII):

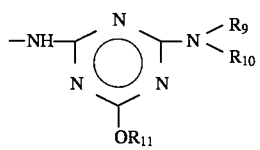

(VII)

wherein $R_9$, $R_{10}$ and $R_{11}$ have the same meanings as in formula (IV) of claim 1, is bonded to the 7-position of the 1-naphthol-3-sulfonic acid nucleus.

19. A recording liquid as claimed in claim 1, wherein F in formula (IV) represents a phenyl group or a naphthyl group, each having at least one substituent selected from a sulfo group, a carboxyl group, an amino group, an acylamino group having from 2 to 7 carbon atoms, a substituted or unsubstituted alkyl group having from 1 to 9 carbon atoms, a substituted or unsubstituted alkoxy group having from 1 to 4 carbon atoms, a hydroxyl group and a halogen atom.

20. A recording liquid as claimed in claim 1, wherein F in formula (IV) represents a phenyl group or a naphthyl group each having at least one of a sulfo group or a carboxyl group.

21. A recording liquid as claimed in claim 1, wherein F in formula (IV) represents a phenyl group having one or two carboxyl groups.

22. A recording liquid as claimed in claim 1, wherein G in formula (IV) represents a group represented by formula (VIII):

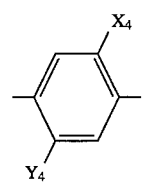

(VIII)

wherein $X_4$ and $Y_4$ each independently represents a group selected from a sulfo group, a carboxyl group, a substituted or unsubstituted alkyl group having from 1 to 9 carbon atoms, a substituted or unsubstituted alkoxy group having from 1 to 4 carbon atoms and an acylamino group having from 2 to 7 carbon atoms, and $Y_4$ may be a hydrogen atom.

23. A recording liquid as claimed in claim 1, wherein G in formula (IV) represents a 1,4-naphthylene group substituted with a sulfo group.

24. A recording liquid as claimed in claim 1, wherein, in formula (IV), one of $R_9$ and $R_{10}$ represents a hydrogen atom and the other represents a group selected from a substituted or unsubstituted alkyl group having from 1 to 4 carbon atoms, a substituted or unsubstituted alkoxy group having from 1 to 4 carbon atoms, an aryl group and a cyclohexyl group, and is substituted with a carboxyl group.

25. A recording liquid as claimed in claim 1, wherein $R_{11}$ in formula (IV) represents a group selected from a hydrogen atom, a substituted or unsubstituted alkyl group having from 1 to 18 carbon atoms, an allyl group, an aryl group, a cyclohexyl group and a heterocyclic group.

26. A recording liquid as claimed in claim 1, wherein said recording liquid comprises from 45 to 95% by weight of water, from 10 to 50% by weight of an aqueous organic solvent, and from 0.5 to 5% by weight of at least one dye selected from dyes, a free acid form of which is represented by formula (I), (II), (III) and (IV).

* * * * *